United States Patent
Witte et al.

(10) Patent No.: US 6,691,122 B1
(45) Date of Patent: Feb. 10, 2004

(54) METHODS, SYSTEMS, AND COMPUTER PROGRAM PRODUCTS FOR COMPILING INFORMATION INTO INFORMATION CATEGORIES USING AN EXPERT SYSTEM

(75) Inventors: Curt J. Witte, Raleigh, NC (US); James A. Grundner, Cary, NC (US); Basil Evrenidis, Raleigh, NC (US)

(73) Assignee: Peopleclick.com, Inc., Raleigh, NC (US)

(*) Notice: Subject to any disclaimer, the term of this patent is extended or adjusted under 35 U.S.C. 154(b) by 428 days.

(21) Appl. No.: 09/699,781

(22) Filed: Oct. 30, 2000

(51) Int. Cl.[7] .............................................. G06F 17/30
(52) U.S. Cl. ........................ 707/101; 707/3; 707/6; 707/103; 707/104; 707/10; 705/8
(58) Field of Search .............................. 705/1, 8; 707/3, 707/101, 103, 104, 10

(56) References Cited

U.S. PATENT DOCUMENTS

| | | | | |
|---|---|---|---|---|
| 5,918,207 A | * | 6/1999 | McGovern et al. | 705/1 |
| 5,978,768 A | | 11/1999 | McGovern et al. | 705/1 |
| 5,999,939 A | | 12/1999 | de Hilster et al. | 707/102 |
| 6,049,776 A | * | 4/2000 | Donnelly et al. | 705/8 |
| 6,185,573 B1 | * | 2/2001 | Angelucci et al. | 707/104.1 |
| 6,266,659 B1 | * | 7/2001 | Nadkarni | 707/3 |
| 6,385,620 B1 | * | 5/2002 | Kurzius et al. | 707/104.1 |
| 2001/0042000 A1 | * | 11/2001 | Defoor, Jr. | 705/9 |
| 2002/0032576 A1 | * | 3/2002 | Abbott et al. | 705/1 |

* cited by examiner

Primary Examiner—Jean M. Corrielus
(74) Attorney, Agent, or Firm—Myers Bigel Sibley & Sajovec, P.A.

(57) ABSTRACT

Embodiments of methods, systems, and computer program products are provided for compiling information into information categories using an expert system. For example, multiple information categories may be defined and, for each information category, a fact table may be provided that contains facts and rules associated with the respective information category. The information to be compiled may be encoded as multiple data strings and received as a digital data stream. An inference engine is then used to process the facts, the rules, and the data strings for at least one of the fact tables to associate one or more of the data strings with at least one of the information categories. The data strings that are associated with the information categories may then be arranged in a file based on their information category associations. By using the inference engine and fact tables to associate data strings with information categories, non-standardized information may be organized by category and then arranged in a file based on these categories. The resulting file may be more readily processed by other applications because the information contained therein may be arranged in a consistent, predetermined manner.

61 Claims, 11 Drawing Sheets

METHODS, SYSTEMS, AND COMPUTER PROGRAM PRODUCTS FOR COMPILING INFORMATION INTO INFORMATION CATEGORIES USING AN EXPERT SYSTEM

BACKGROUND OF THE INVENTION

The present invention relates generally to the field of information processing, and, more particularly, to using artificial intelligence to compile information.

To facilitate searching, sorting, combining, and various other functions, information may be stored electronically in a database. A database is generally structured as a set of records with each record containing one or more fields. Unlike a data structure, such as an array, in which all the array elements represent the same type of information, each field in a record typically represents a different type of information. A record may be accessed as a collection of fields or, alternatively, the various fields in a record may be accessed individually by name.

Although databases are generally characterized by their highly organized structure of records and fields, the information to be stored in a database may not be as highly organized. For example, consider a database for storing résumés for job candidates. Most résumés contain the following types of information: demographic information (e.g., name, address, telephone number, electronic mail address, etc.), education information, and job experience information. Nevertheless, while these various types of information are generally present in most résumés, they may not be arranged in a standardized format. As a result, it may be difficult to store candidate résumés in a database in a consistent manner such that a user may search, sort, or otherwise process the résumés according to some criterion.

Consequently, there exists a need for improvements in compiling and organizing information such that the information may be more readily accessed and processed when saved in, for example, a database.

SUMMARY OF THE INVENTION

Embodiments of the present invention may include methods, systems, and computer program products for compiling information into information categories using an expert system. For example, multiple information categories may be defined and, for each information category, a fact table may be provided that contains facts and rules associated with the respective information category. The information to be compiled may be encoded as multiple data strings and received as a digital data stream. An inference engine is then used to process the facts, the rules, and the data strings for at least one of the fact tables to associate one or more of the data strings with at least one of the information categories. The data strings that are associated with the information categories may then be arranged in a file based on their information category associations.

By using the inference engine and fact tables to associate data strings with information categories, non-standardized information may be organized by category and then arranged in a file based on these categories. The resulting file may be more readily processed by other applications because the information contained therein may be arranged in a consistent, predetermined manner.

The fact tables may be viewed as a knowledge base and the inference engine and fact tables together may be viewed as an expert system for associating information with information categories. Because rules may be developed for the expert system to account for various organizations of data strings in the received data stream, a programmatic approach to categorizing the data strings need not be followed. For example, when processing information from a résumé, the expert system need not rely on the candidate's name being at the beginning of the résumé or the use of specific subtitles, such as "EXPERIENCE" or "EDUCATION" in the body of the résumé.

In particular embodiments of the present invention, a determination may be made whether data strings are encoded using the American Standard Code for Information Interchange (ASCII) coding scheme. If the data strings are encoded using a non-ASCII coding scheme, then the data strings may be translated into ASCII to facilitate further processing.

In embodiments of the present invention, the facts may include, but are not limited to, names, words, phrases, acronyms, terms of art, number strings (e.g., zip codes, area codes), geographic names, etc. The rules may comprise fact match rules, pattern match rules, and proximity search rules.

In further embodiments of the present invention, the inference engine may process the facts, the fact match rules, and the data strings for one or more of the fact tables to associate data strings with the information categories. The inference engine may also process the pattern match rules and the data strings for one or more of the fact tables to associate data strings with the information categories. The pattern match rules may include rules related to sequences of data strings. Finally, the inference engine may process the proximity search rules and the data strings for one or more of the fact tables to associate data strings with the information categories. The proximity search rules may include rules related to the relative location of data strings in the data stream. For example, when processing information from a résumé, if the term "GPA" is located near the term "EDUCATION," then it may be interpreted as "Grade Point Average" and may be associated with an education category. Alternatively, if the term "GPA" is located closer to the term "EXPERIENCE," then it may be interpreted as an acronym for a skill, job responsibility, etc. and may be associated with an employment category.

In particular embodiments of the present invention, the information categories may be tailored for compiling information from a résumé. Accordingly, the information categories may include a demographic category, a skill set category, an education and employment category, and a career progression category. The number of occurrences for each data string that is associated with the skill set category may be determined and the number of occurrences for each data string that is associated with the career progression category and corresponds to job position title information may be determined. These "hit counts" may be indicative of the relative importance of a particular candidate's skills and job titles.

In further embodiments of the present invention, a qualitative rank may be determined for each data string that is associated with the career progression category and corresponds to job position title information or job responsibility information. These qualitative rankings may be based on weights assigned to job position titles and job responsibilities in the fact tables. The weights assigned to the job position titles and job responsibilities in the fact tables may be dynamically set by a user based the type of qualifications sought in a job candidate.

In still further embodiments of the present invention, in addition to the data strings that are associated with the information categories, the number of occurrences for each data string that is associated with the skill set category, the number of occurrences for each data string that is associated with the career progression category and corresponds to job position title information, and the qualitative rank for each data string that is associated with the career progression category and corresponds to job position title information or job responsibility information may also be arranged in a file based on the associations between the data strings and the information categories.

The file containing the data strings associated with the information categories may be an extensible markup language (XML) file. Advantageously, XML may allow the file to be described in terms of logical parts or elements. For example, the information categories and the various types of information that belong to each category may be represented in the XML file as specific elements.

In further embodiments of the present invention, the data strings may be added to the XML file in their received arrangement. For example, if the data strings comprise information from a résumé, then the entire résumé, without any processing or formatting performed thereon, may be added to the XML file. To facilitate processing by other applications, the XML file may be saved in a structured query language (SQL) database. In addition, the XML file may be sent to the originator of the digital data stream (e.g., the source of a résumé file or other information stream).

In other embodiments of the present invention, unknown data strings may be identified by removing those data strings that are either known to be uncorrelated with any of the information categories (e.g., "noise" terms) or are represented by a corresponding fact in the fact tables. Any data string that remains may be considered to be an "unknown" data string and may be added to a pending fact table. Moreover, the pending fact table may include multiple pending fact tables corresponding to the fact tables associated with the information categories.

In still other embodiments of the present invention, the number of occurrences for each data string in each one of the pending fact tables may be determined. These number of occurrences or "hit counts" may then be compared with thresholds that are defined for each of the pending fact tables. If the number of occurrences of a data string exceeds the threshold defined for a particular pending fact table, then that data string may be added to the fact table associated with the pending fact table. Thus, new facts may be "learned" when their frequency rises to a level that suggests that they may be used in connection with a particular information category.

In yet other embodiments of the present invention, the number of occurrences for each data string in each one of the pending fact tables may be determined and then the data strings for each of the pending fact tables may be ranked based on these number of occurrences or "hit counts." The ranked data strings may be displayed on, for example, a display monitor to allow a user to select which of the data strings in each of the pending fact tables to add to the respectively associated fact tables. New facts may be "learned" by adding those data strings in the pending fact tables that are selected by the user to the appropriate corresponding fact tables. In addition, a user may identify those data strings in the pending fact tables that are uncorrelated with any of the information categories and, thus, may be treated as "noise" terms.

The present invention may be used to compile information that may be received as multiple data strings arranged in a variety of different formats into a structured arrangement or format by using an expert system to associate the data strings with predetermined information categories. For example, the present invention may be used to compile information from candidate résumés, which may be written in many different types of formats or styles, into a structured arrangement in which the information is organized based on a set of information categories that are typically associated with a résumé. Once the information has been arranged in a structured format, other applications may more readily access and process the information because of the uniformity in which the information is arranged and stored.

While the present invention has been described above primarily with respect to method aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
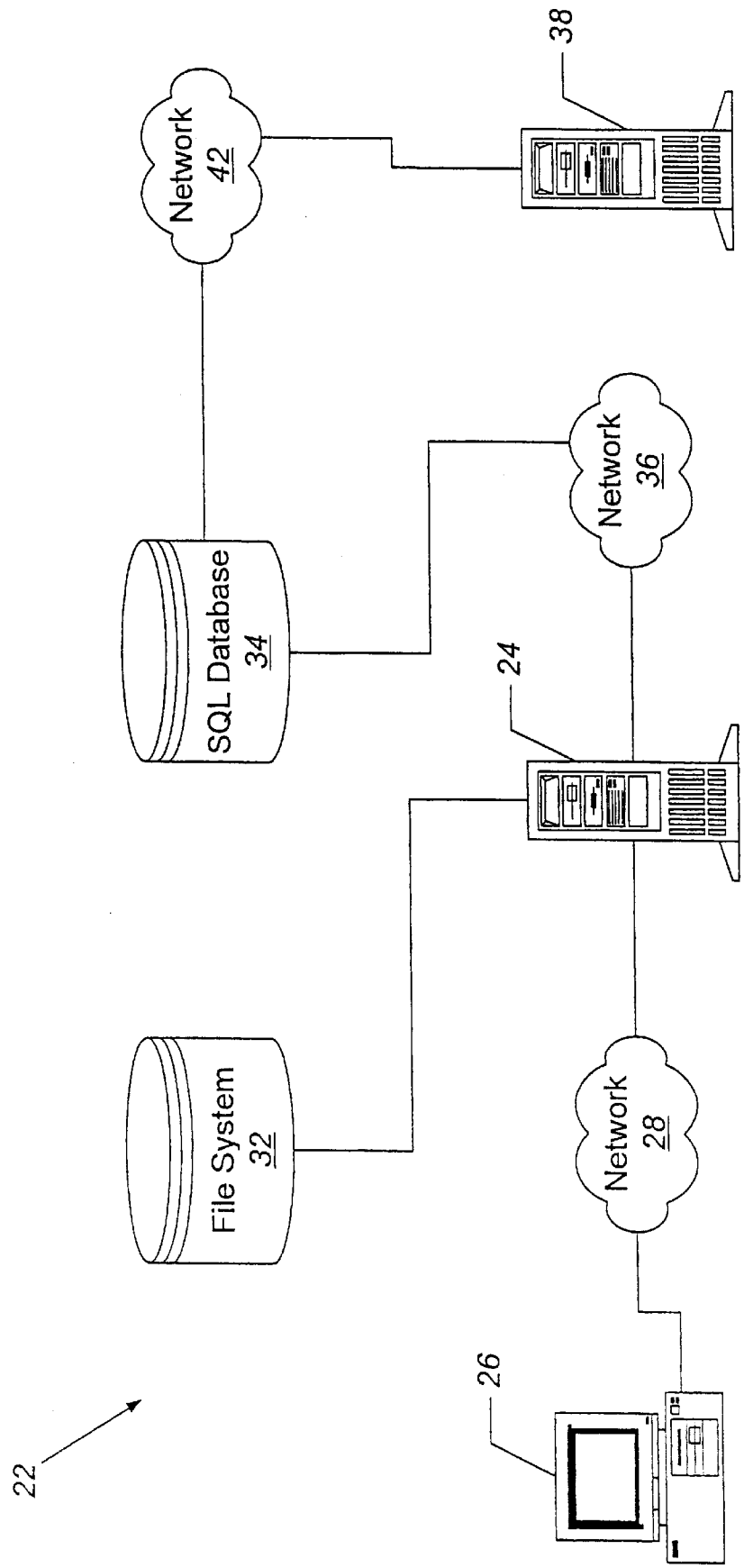
FIG. 1 is a block diagram that illustrates communication network architectures that facilitate communication and compilation of information in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be particularly applicable for compiling information that is extracted from a résumé. As such, the present invention is described herein in that context. It will be understood, however, that the concepts and principles of the present invention may be applied to compile information from alternative information sources.

The present invention may be embodied as methods, systems, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary communication system 22 network architecture in accordance with embodiments of the present invention includes a data processing system 24 that is coupled to one or more computers 26 over a network 28. The computer 26 represents an end user or client system on which a résumé may be generated. For example, a job candidate may generate their résumé on the computer 26 and then forward the résumé over the network 28 to the data processing system 24, which may belong to an employer. Alternatively, in accordance with another exemplary application, the computer 26 may represent a computer system in an employer's personnel department that contains electronic versions of résumés received from job candidates. These résumés may then be sent from the computer 26 to the data processing system 24 for further processing as will be described in detail herein. Accordingly, network 28 may represent a global network, such as the Internet, or other network accessible by the general public. Network 28 may also, however, represent a wide area network, a local area network, an Intranet, or other private network, which is not accessible by the general public. Furthermore, network 28 may represent a combination of public and private networks or a virtual private network (VPN).

The data processing system 24 may be configured with computational, storage, and control program resources for compiling information into information categories in accordance with the present invention. Thus, the data processing system 24 may be implemented as a single processor system, a multi-processor system, or even a network of stand-alone computer systems. The data processing system 24 may communicate with a local file system 32 for storing received and compiled information (e.g., received and compiled résumés).

In addition, the data processing system 24 may communicate with a structured query language (SQL) database 34 over a network 36 to store compiled information (e.g., compiled résumés). It may be desirable to store compiled information in the SQL database 34 to allow other applications to access the compiled information. Advantageously, applications may access the SQL database 34 without having to know the proprietary interface of the underlying database. As shown in FIG. 1, applications running on computer 38 may access the compiled information in the SQL database 34 over a network 42 using standardized SQL requests. The owner(s) of the data processing system 24, the SQL database 34, and computer 38 may be affiliated or they may be unaffiliated. Moreover, the data processing system 24, the SQL database 34, and the computer 38 may be remotely located from one another or they may be located in relative close proximity to each other. Therefore, similar to network 28, networks 36 and 42 may represent a global network, such as the Internet, or other network accessible by the general public. Networks 36 and 42 may also represent a wide area network, a local area network, an Intranet, or other private network, which is not accessible by the general public. Furthermore, networks 36 and 42 may represent a combination of public and private networks or a virtual private network (VPN). In view of the foregoing, even though networks 28, 36, and 42 are illustrated in FIG. 1 as separate networks, any subcombination or combination of networks 28, 36, and 42 may be embodied as a single network.

Although FIG. 1 illustrates an exemplary communication system 22 network architecture that may facilitate compiling information into information categories, it will be understood that the present invention is not limited to such a configuration but is intended to encompass any configuration capable of carrying out the operations described herein.

Figure 2:
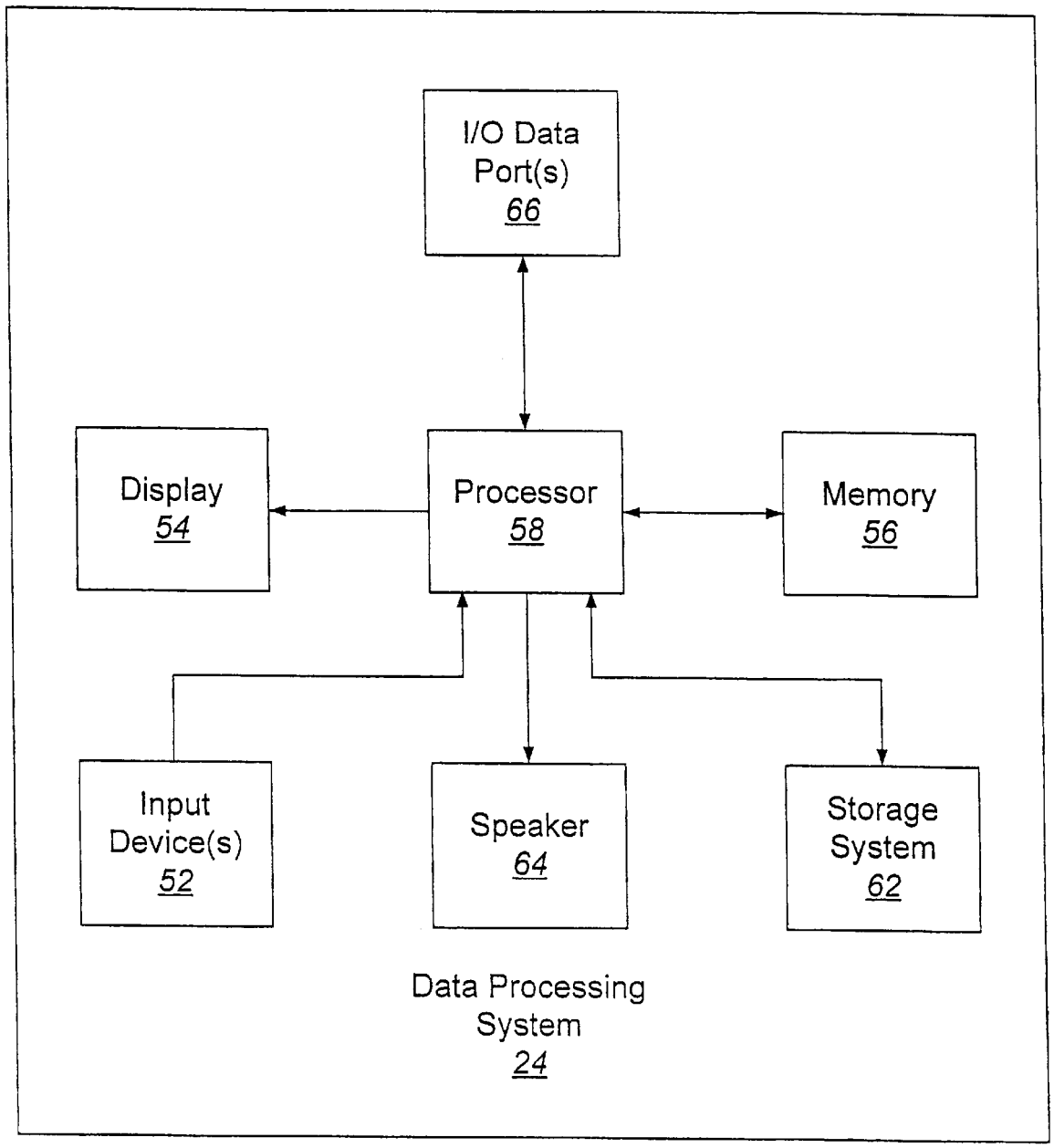
FIG. 2 is a block diagram that illustrates data processing systems in accordance with embodiments of the present invention.

With reference to FIG. 2, embodiments of the data processing system 24 may include input device(s) 52, such as a keyboard or keypad, a display 54, and a memory 56 that communicate with a processor 58. The data processing system 24 may further include a storage system 62, a speaker 64, and an input/output (I/O) data port(s) 66 that also communicate with the processor 58. The storage system 62 may include removable and/or fixed media, such as floppy disks, ZIP drives, hard disks, or the like, as well as virtual storage, such as a RAMDISK. The I/O data port(s) 66 may be used to transfer information between the data processing system 24 and another computer system or a network (e.g., the Internet). These components may be conventional components such as those used in many conventional computing devices, which may be configured to operate as described herein.

Figure 3:
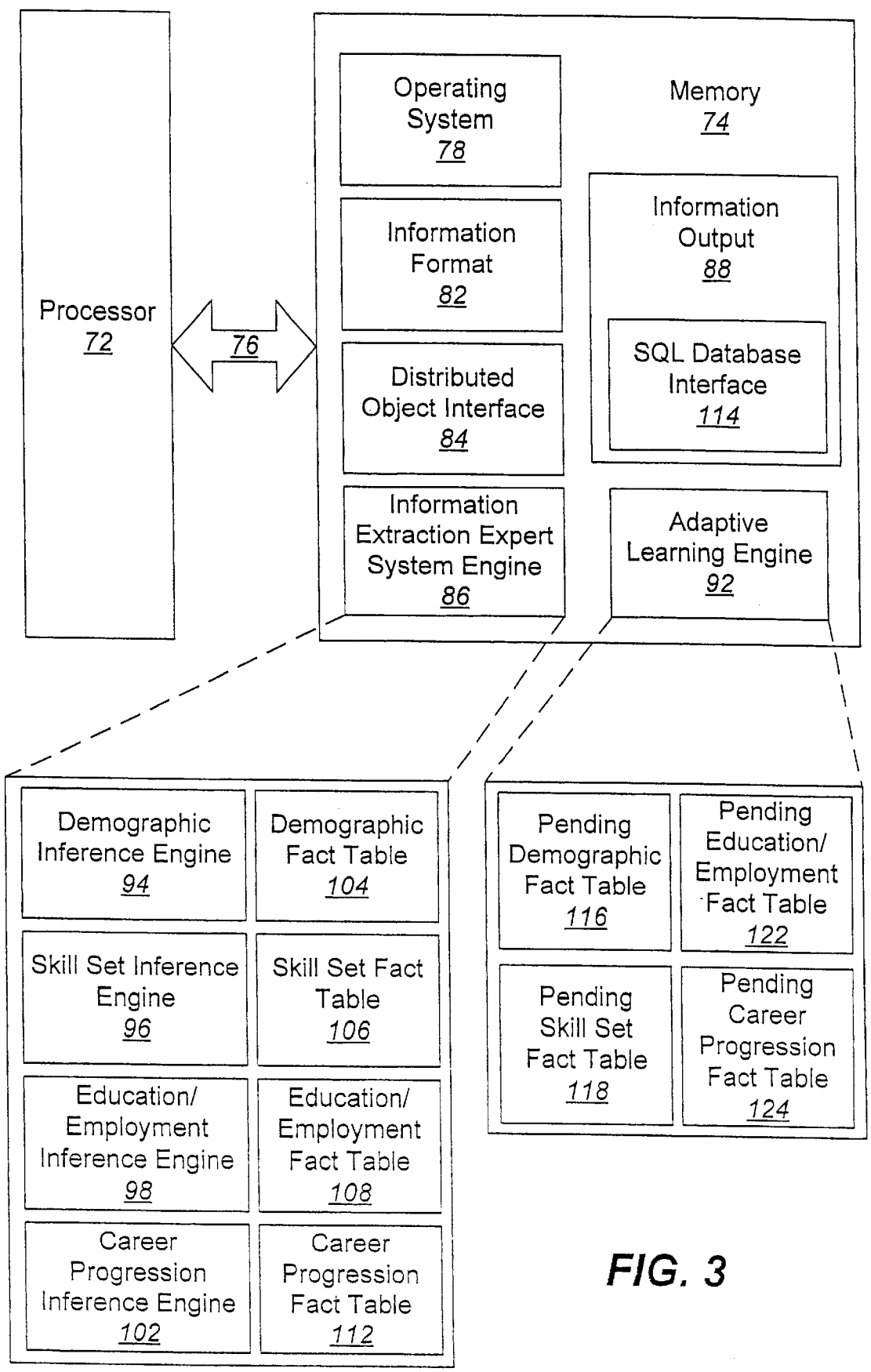
FIG. 3 is a block diagram that illustrates methods, systems, and computer program products for compiling information into information categories in accordance with embodiments of the present invention.

FIG. 3 illustrates a processor 72 and a memory 74, that may be used in embodiments of methods, systems, and computer program products for compiling information into information categories in accordance with embodiments of the present invention. The processor 72 communicates with the memory 74 via an address/data bus 76. The processor 72 may be, for example, a commercially available or custom microprocessor. The memory 74 is representative of the overall hierarchy of memory devices containing the software and data used to compile information into information categories in accordance with the present invention. The memory 74 may include, but is not limited to, the following types of devices: cache, ROM, PROM, EPROM, EEPROM, flash, SRAM, and DRAM.

As shown in FIG. 3, the memory 74 may hold six major categories of software and data: an operating system 78; an information format program module 82; a distributed object interface program module 84; an information extraction expert system engine program module 86; an information output program module 88; and an adaptive learning engine program module 92. The operating system 78 controls the operation of the data processing system. In particular, the operating system 78 may manage the data processing system's resources and may coordinate execution of programs by the processor 72.

The information format module 82 may be configured to determine whether received information (e.g., a received résumé) is encoded using the American Standard Code for Information Interchange (ASCII) coding scheme. If the received information is encoded using a non-ASCII coding scheme, then the information format module 82 may translate the received information into ASCII to facilitate further processing.

The distributed object interface module 84 may be configured to allow the software modules in the memory 74 to be implemented as an object-oriented system that has objects distributed across a heterogeneous network. For example, the objects may be distributed across different data processing systems in a network and yet appear to each other as if they were local. In a distributed object-oriented computer system, client objects may be given object handles to reference remote server objects. A remote object is an object whose class is implemented in a process that is different from the process in which the object handle resides. Moreover, a remote object may be implemented on a data processing system that is remote from the data processing system on which the object handle resides. An object handle identifies a remote, server object and may allow a client object to invoke member functions of the remote object. Three exemplary distributed object models are the Distributed Component Object Model (DCOM), the Common Object Request Broker Architecture (CORBA) model, and the Java Remote Method Invocation (RMI) model. These three models are briefly discussed hereafter.

The DCOM model uses a protocol called Object Remote Procedure Call (ORPC) to support remote objects. A DCOM server object can support multiple interfaces with each interface representing a different behavior of the object. In general, an interface is a set of functionally related methods. A DCOM client object may acquire a pointer to one of a DCOM server object's interfaces and may invoke methods through that pointer as if the server object resided in the DCOM client object's address space. Resources for developing distributed software using DCOM may be obtained from Microsoft Corporation, One Microsoft Way, Redmond, Wash. 98052.

The CORBA model is based on an Object Request Broker (ORB) that acts as an object bus over which objects may transparently interact with one another irrespective of whether they are located locally or remotely. A CORBA server object supports an interface that consists of a set of methods. A particular instance of a CORBA server object is identified by an object reference. The object reference may be used by a CORBA client object to make method calls to the CORBA server object as if the CORBA client object and the CORBA server object shared the same address space. Resources for developing distributed software using CORBA may be obtained from the Object Management Group, 250 First Avenue, Needham, Mass 02494.

The Java RMI model is specific to the Java programming language and relies on a protocol called Java Remote Method Protocol (JRMP). A Java RMI server object supports an interface that can be used by a Java RMI client object running on a different Java Virtual Machine (JVM) than the Java RMI server object to access Java RMI server object methods. In particular, a naming mechanism called RMIRegistry is implemented that contains information about the Java RMI server objects and runs on the server JVM. A Java RMI client may acquire a reference to a Java RMI server object by doing a lookup in the RMIRegistry. The Java RMI server object reference may then be used by the Java RMI client object to invoke Java RMI server object methods as if the Java RMI client and server objects resided on the same JVM. Resources for developing distributed software using Java RMI may be obtained from Sun Microsystems, Inc., 901 San Antonio Road, Palo Alto, Calif. 94303.

The information extraction expert system engine module 86 may be configured to embody an expert system that may be used to compile information into information categories by extracting data associated with the various information categories from a received data stream, such as a résumé. A brief overview of expert systems may be helpful to provide context for the following discussion of embodiments of the present invention. Expert systems may be defined as programs that emulate human expertise or logic in certain predefined problem domains. One commonly used technique that may be used in expert systems is known as rule-based programming. In this programming model, rules are used to specify an action or set of actions that are to be performed in a given situation. A rule may comprise an "if" portion and a "then" portion. The "if" portion of a rule may be implemented as a series of fact pattern(s) that cause the rule to be applicable. The expert system may use an "inference engine" to match the fact patterns in the rules against input data to determine which rules are applicable for a given situation. If the inference engine determines that a particular rule is applicable, then the actions comprising the "then" portion of that particular rule are executed. The inference engine continues to execute actions for all applicable rules until no applicable rules remain. Note, however, that the actions for one rule may affect the data that is compared against the fact patterns for the other rules to determine their applicability. Accordingly, an inapplicable rule may become applicable after the inference engine executes the actions for another rule, and vice versa.

Multiple tools exist for developing an expert system. One exemplary expert system development tool that may be used in embodiments of the present invention is known as the C Language Integrated Production System (CLIPS). CLIPS may provide a language environment for the construction of a rule and may allow the expert system to be implemented using object-oriented programming techniques. CLIPS may be obtained from COSMIC (CLIPS Sales), University of Georgia, 382 East Broad Street, Athens, Ga. 30602.

As discussed hereinabove, the present invention may be used to compile information into information categories. In particular embodiments of the present invention, the information categories may be tailored for compiling information from a résumé. These information categories may include a demographic category, a skill set category, an education and employment category, and a career progression category. The demographic category may include information found on a résumé regarding a job candidate's location and status such as name, address, phone number, current salary/compensation, World Wide Web (WWW) site address, etc. The skill set category may include information found on a résumé regarding a job candidate's specific workplace skills, such as ability to program in a certain programming language, ability to operate a specific machine, ability to speak a certain language, etc. The education and employment category may include information found on a résumé regarding a job candidate's education and employment history, such as companies worked for and dates of employment, job position titles, schools attended and dates of attendance, etc. Finally, the career progression category may include information found on a résumé that may be indicative of a candidate's career growth. That is, the career progression category may include information that may indicate whether the candidate's career has progressed over time to include positions of greater authority or assignments of greater responsibility or whether the candidate's career may have stagnated.

Thus, as shown in FIG. 3, the information extraction expert system engine module 86 may include a demographic inference engine 94, a skill set inference engine 96, an education and employment inference engine 98, and a career progression inference engine 102. In addition, the information extraction expert system engine module 86 may include a demographic fact table 104, a skill set fact table 106, an education and employment fact table 108, and a career progression fact table 112. The fact tables 104, 106, 108, and 112 may include both facts and rules.

The facts may include, but are not limited to, names, words, phrases, acronyms, terms of art, number strings (e.g., zip codes, area codes), geographic names, etc. The rules may comprise fact match rules, pattern match rules, and proximity search rules. The received information may be viewed as a digital data stream encoded as multiple data strings. Thus, the inference engines 94, 96, 98, and 102 may use the fact match rules to match data strings with facts from the fact tables 104, 106, 108, and 112. The inference engines 94, 96, 98, and 102 may use the pattern match rules to match sequences of data strings with fact patterns from the fact tables 104, 106, 108, and 112. Finally, the inference engines 94, 96, 98, and 102 may use the proximity search rules to match data strings with facts from the fact tables 104, 106, 108, and 112 based on the relative location of the data strings in the digital data stream (e.g., the position of various pieces of information in a résumé).

The fact tables 104, 106, 108, 112 may be collectively viewed as a knowledge base containing rules and facts that may be used by the respective inference engines 94, 96, 98, and 102 to associate received information with the respective information categories. Note that although the inference engines and fact tables are illustrated as separate modules corresponding to each respective information category, it will be understood that the inference engines and fact tables may be respectively implemented as a single logical unit.

The information output module 88 may be configured to arrange the compiled information that has been associated with the information categories into a file, such as an extensible markup language (XML) file. Advantageously, XML may allow the file to be described in terms of logical parts or elements. For example, the information categories and the various types of information that belong to each category may be represented in the XML file as specific elements. In addition, the information output module 88 may include an SQL database interface module 114 for saving the file containing the compiled information to an SQL database, such as the SQL database 34 described hereinabove with reference to FIG. 1.

Finally, the adaptive learning engine module 92 may be configured to learn unknown information by removing those data strings from a received data stream that are either known to be uncorrelated with any of the information categories or are represented by a corresponding fact in the fact tables 104, 106, 108, and 112. Those data strings that are known to be uncorrelated with any of the information categories may be called "noise" terms and include terms that are used in languages to make the language flow, i.e., to express statements by way of sentences, paragraphs, etc. The data strings that remain after removing all known terms and noise terms may be considered to be unknown and may be added to a pending fact table for further processing.

As shown in FIG. 3, the pending fact table may be implemented as four pending fact tables corresponding to the four fact tables 104, 106, 108, and 112 used by the information extraction expert system engine 86. In particular, the pending fact table may comprise a pending demographic fact table 116, a pending skill set fact table 118, a pending education and employment fact table 122, and a pending career progression fact table 124. As will be discussed in detail hereinafter, data strings stored in the pending fact tables 116, 118, 122, and 124 may be processed to determine whether they should be added to the corresponding fact tables 104, 106, 108, and 112. In this manner, new facts may be "learned" as data strings are added to the fact tables 104, 106, 108, and 112 from the pending fact tables 116, 118, 122, and 124 to thereby enlarge the content of the knowledge base.

Although FIG. 3 illustrates an exemplary software architecture that may facilitate compiling information into information categories using an expert system, it will be understood that the present invention is not limited to such a configuration but is intended to encompass any configuration capable of carrying out the operations described herein.

Computer program code for carrying out operations of the respective program modules may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

With reference to the flowchart of FIG. 4 and the architectural block diagrams of FIGS. 1 and 3, exemplary operations of methods, systems, and computer program products for compiling information into information categories using an expert system, in accordance with embodiments of the present invention, will be described hereafter. Operations begin at block 132 where a calling application running on computer 26 generates a digital data stream of information that is encoded as multiple data strings and transmits this digital data stream to the data processing system 24 where it is received. The digital data stream may be, for example, a résumé generated by a job candidate at the computer 26. The computer 26 may also represent a computer system in an employer's personnel department that contains electronic versions of résumés received from job candidates. The personnel department computer 26 may then transmit a résumé as a digital data stream to the data processing system 24 for further processing as will be described hereinafter.

Figure 5:
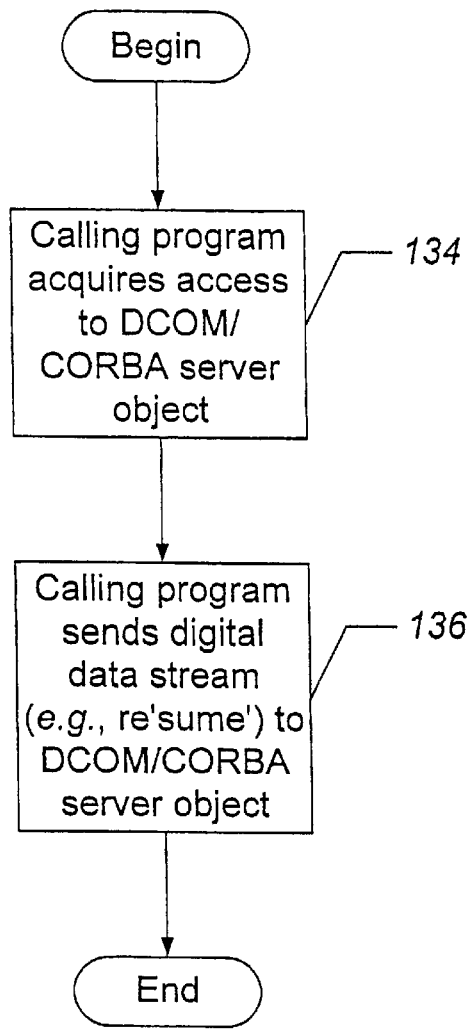

In accordance with particular embodiments of the present invention illustrated in FIG. 5, the calling application program on the computer 26 may be part of a distributed object-oriented software system that is supported, for example, by the distributed object interface module 84 running on the data processing system 24. The calling application running on the computer 26 may, therefore, be viewed as a client object while the distributed object interface module 84 may be viewed as a server object. For example, as illustrated in FIG. 5, the calling application (i.e., client object) may acquire access to the methods of a server object (e.g., a DCOM, CORBA, or Java RMI server object) at block 134 as discussed hereinabove with respect to the distributed object interface 84 of FIG. 3. At block 136, the calling application may send the digital data stream (e.g., the résumé) to the data processing system 24 through invocation of one or more server object methods on the data processing system 24.

Figure 6:
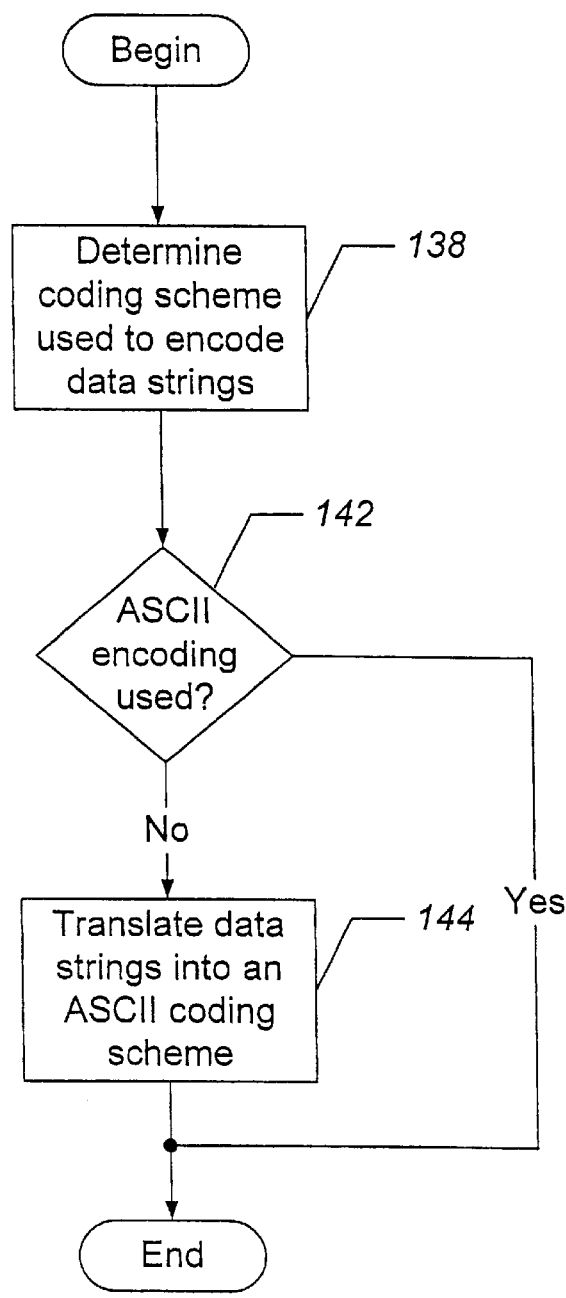

A received data stream may be encoded in a variety of different coding standards. To facilitate processing of the received data stream at the data processing system 24, the information format module 82 may format the received data strings in accordance with embodiments of the present invention as illustrated in FIG. 6. In particular, the information format module 82 may determine the coding scheme used to encode the received data strings at block 138. If the data strings are not encoded in ASCII format at block 142, then the information format module 82 may translate the received information into the ASCII coding scheme at block 144. If the information format module 82 is unable to decipher the coding scheme used to encode the received data strings at block 138, then the received data stream may be saved in a file for review by a system administrator.

Returning to FIG. 4, the present invention may be used to compile information into information categories. Accordingly, at block 146, multiple information categories may be defined for use in compiling the received information encoded as the multiple data strings. In particular embodiments of the present invention, the information categories may be tailored for compiling information from a résumé. These information categories may include a demographic category, a skill set category, an education and employment category, and a career progression category as discussed hereinabove with respect to FIG. 3.

At block 148, multiple fact tables may be provided that correspond to the multiple information categories that are defined at block 146. As shown in FIG. 3, fact tables 104, 106, 108, and 112 may comprise a knowledge base that contains rules and facts that may be used by the information extraction expert system engine 86 to associate the received data strings with the respective information categories. TABLE 1 below lists exemplary facts that may be used in the fact tables 104, 106, 108, and 112 of FIG. 3 to facilitate extraction of information from a digital data stream, such as a résumé, for association with the respective information categories defined at block 146.

TABLE 1

Exemplary Fact List

| Fact | Usage |
| --- | --- |
| Names (e.g., candidate names, street names, etc.) | Used to extract demographic information from the résumé. |
| City | Used to extract demographic information from the résumé. |
| State | Used to demographic information from the résumé. |
| Zip | Used to extract demographic information from the résumé. |
| Area Code | Used to extract demographic information from the résumé. |
| Country | Used to extract demographic information from the résumé. |
| Security Clearances | Used to extract demographic information from the résumé. |
| Skill Names | Used to extract skill set information from the résumé. |
| Company Names | Used to extract education and employment information from the résumé. |
| Position Titles | Used to extract education and employment information and career progression information from the résumé. |
| College Names | Used to extract education and employment information from the résumé. |
| Company Divisions | Used to extract education and employment information from the résumé. |
| Degree Types | Used to extract education and employment information from the résumé. |
| Majors and Minors | Used to extract education and employment information from the résumé. |
| Certifications | Used to extract education and employment information from the résumé. |
| Publications | Used to extract education and employment information from the résumé. |
| Achievements | Used to extract education and employment information from the résumé. |
| Responsibilities | Used to extract career progression information from the résumé. |

Figure 7:
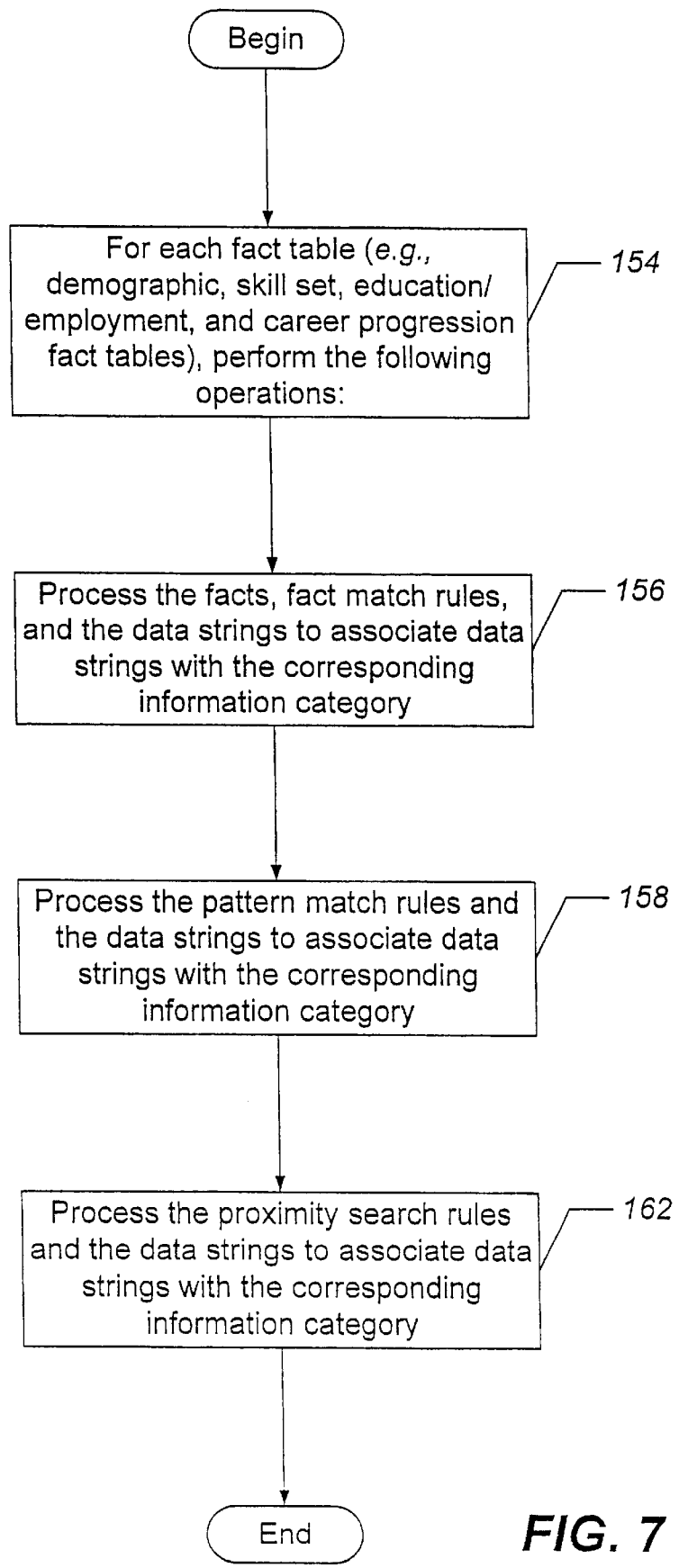

The information extraction expert system engine 86 may use the inference engines 94, 96, 98, and 102 corresponding to the respective information categories to associate the data strings of the received digital data stream with the respective information categories at block 152. Particular embodiments of the present invention are illustrated in FIG. 7 in which the information extraction expert system engine 86 performs a set of operations for each of the fact tables 104, 106, 108, and 112 as indicated at block 154. The fact tables may include both facts and rules. Moreover, as discussed hereinabove, the rules may include fact match rules, pattern match rules, and proximity search rules. Therefore, for each fact table 104, 106, 108, and 112, the corresponding inference engine 94, 96, 98, and 102 may process the facts, fact match rules, and the received data strings to extract those data strings from the received data stream that are associated with the corresponding information category at block 156. Similarly, for each fact table 104, 106, 108, and 112, the corresponding inference engine 94, 96, 98, and 102 may process the pattern match rules and the received data strings to extract those data strings from the received data stream that are associated with the corresponding information category at block 158. And, finally, for each fact table 104, 106, 108, and 112, the corresponding inference engine 94, 96, 98, and 102 may process the proximity search rules and the received data strings to extract those data strings from the received data stream that are associated with the corresponding information category at block 162. It should be understood that for particular embodiments of the present invention, each fact table may not necessarily include fact match rules, pattern match rules, and proximity search rules. That is, a given fact table may use only pattern match rules or pattern match rules and proximity search rules. In general, a fact table may include any subcombination or combination of the three rule types.

For example, as illustrated in TABLE 2 below, the following types of information elements may be extracted from the received data stream (e.g. a résumé) and associated with the demographic information category using the listed methodologies.

TABLE 2

Demographic Category Information Elements

| Information Element | Method of Extraction and Association |
|---|---|
| First Name | Fact Match Rule Searches; and Proximity Rule Searches if the Fact Match Rule Searches fail. |
| Last Name | Fact Match Rule Searches; and Proximity Rule Searches if the Fact Match Rule Searches fail. |
| Middle Initial | Fact Match Rule Searches; and Proximity Rule Searches if the Fact Match Rule Searches fail. |
| Suffix | Fact Match Rule Searches; and Proximity Rule Searches if the Fact Match Rule Searches fail. |
| Address | Pattern Match Rule Searches and Fact Match Rule Searches; and Proximity Rule Searches and Fact Match Rule Searches if the Pattern Match Rule Searches and Fact Match Rule Searches fail. |
| City | Fact Match Rule Searches; and Proximity Rule Searches if the Fact Match Rule Searches fail. |
| State | Fact Match Rule Searches; and Proximity Rule Searches if the Fact Match Rule Searches fail. |
| Zip or Postal Code | Fact Match Rule Searches; and Proximity Rule Searches if the Fact Match Rule Searches fail. |
| Area Code | Fact Match Rule Searches; and Proximity Rule Searches if the Fact Match Rule Searches fail. |
| Phone Number(s) | Fact Match Rule Searches; and Proximity Rule Searches if the Fact Match Rule Searches fail. |
| Country | Fact Match Rule Searches; and Proximity Rule Searches if the Fact Match Rule Searches fail. |
| Low Compensation | Pattern Match Rule Searches and Fact Match Rule Searches. |
| High Compensation | Pattern Match Rule Searches and Fact Match Rule Searches. |
| E-Mail Address | Pattern Match Rule Searches and Fact Match Rule Searches. |
| Security Clearances | Fact Match Rule Searches; and Pattern Match Rule Searches if the Fact Match Rule Searches fail. |
| Web Site | Pattern Match Rule Searches and Fact Match Rule Searches. |
| Job Code | Proximity Match Rule Searches and Pattern Match Rule Searches. |
| Region | This is a computed information element based on location information. |

TABLE 2-continued

Demographic Category Information Elements

| Information Element | Method of Extraction and Association |
|---|---|
| Source (e.g., source of résumé) | Proximity Match Rule Searches and Pattern Match Rule Searches. |

Figure 8:
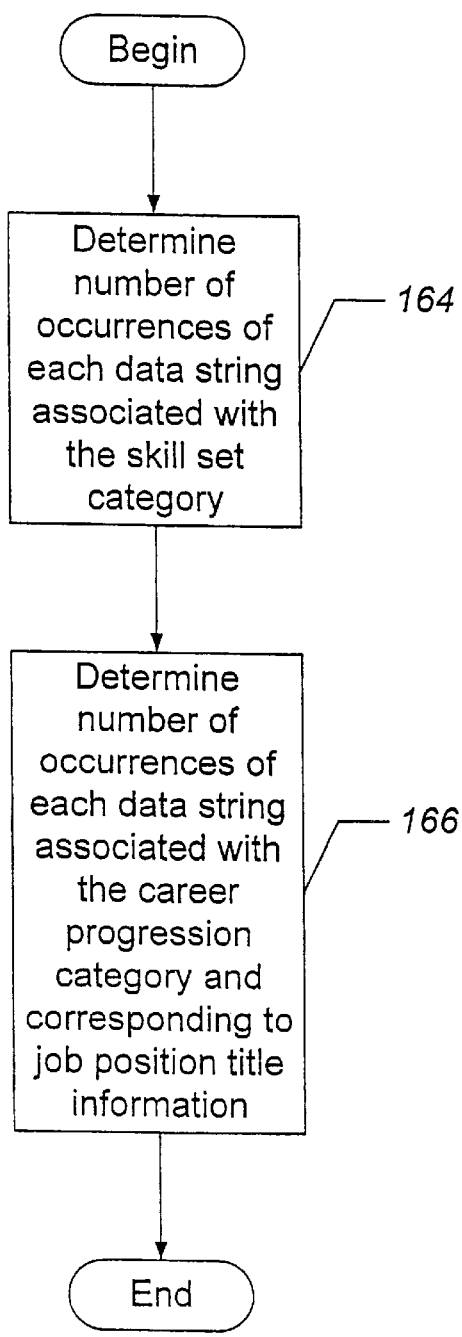

In addition to processing the received data strings and the skill set and career progression fact tables 106 and 112 to associate the received data strings with the skill set and career progression information categories, the skill set inference engine 96 and the career progression inference engine 102 may perform additional computations in accordance with further embodiments of the present invention illustrated in FIG. 8. In particular, the skill set inference engine 96 may determine a number of occurrences or "hit count" for each data string that is associated with the skill set information category at block 164. Similarly, the career progression inference engine may determine a number of occurrences or "hit count" for each data string that is associated with the career progression category and corresponds to job position title information at block 166. These "hit counts" may be indicative of the relative importance of a particular candidate's skills and job titles.

As illustrated in TABLE 3 below, the following types of information elements may be extracted from the received data stream (e.g., a résumé) and associated with the skill set information category using the listed methodologies. In general, skill names may be identified in the received data stream based on facts in the skill set fact table 106 that identify business terms, technology terms, and acronyms.

TABLE 3

Skill Set Category Information Elements

| Information Element | Method of Extraction and Association |
|---|---|
| Skill Name | Fact Match Rule Searches. |
| Number of Occurrences ("Hit Count") | Computed field based on the number of times a Skill Name is found in the résumé. |

As illustrated in TABLE 4 below, the following types of information elements may be extracted from the received data stream (e.g., a résumé) and associated with the education and employment information category using the listed methodologies.

TABLE 4

Education and Employment Category Information Elements

| Information Element | Method of Extraction and Association |
|---|---|
| Date(s) of Employment - Begin | Pattern Match Rule Searches and Proximity Rule Searches. |
| Date(s) of Employment - End | Pattern Match Rule Searches and Proximity Rule Searches. |
| Company Name(s) | Proximity Rule Searches and Fact Match Rule Searches; and |

TABLE 4-continued

Education and Employment Category Information Elements

| Information Element | Method of Extraction and Association |
|---|---|
| | Proximity Rule Searches and Pattern Match Rule Searches if the Proximity Rule Searches and Fact Match Rule Searches fail. |
| Position Title(s) | Proximity Rule Searches and Fact Match Rule Searches; and Proximity Rule Searches and Pattern Match Rule Searches if the Proximity Rule Searches and Fact Match Rule Searches fail. |
| Company Location(s) | Proximity Rule Searches and Fact Match Rule Searches; and Proximity Rule Searches and Pattern Match Rule Searches if the Proximity Rule Searches and Fact Match Rule Searches fail. |
| Company Divisions(s) | Proximity Rule Searches and Pattern Match Rule Searches. |
| College Name(s) | Proximity Rule Searches and Fact Match Rule Searches; and Proximity Rule Searches and Pattern Match Rule Searches if the Proximity Rule Searches and Fact Match Rule Searches fail. |
| Date(s) of Graduation | Proximity Rule Searches and Pattern Match Rule Searches. |
| Type(s) of Degree | Proximity Rule Searches and Fact Match Rule Searches; and Proximity Rule Searches and Pattern Match Rule Searches if the Proximity Rule Searches and Fact Match Rule Searches fail. |
| College Major(s) | Proximity Rule Searches and Fact Match Rule Searches; and Proximity Rule Searches and Pattern Match Rule Searches if the Proximity Rule Searches and Fact Match Rule Searches fail. |
| College Minor(s) | Proximity Rule Searches and Fact Match Rule Searches; and Proximity Rule Searches and Pattern Match Rule Searches if the Proximity Rule Searches and Fact Match Rule Searches fail. |
| Grade Point Average(s) (GPA(s)) | Proximity Rule Searches and Fact Table Searches. |
| Certification(s) | Proximity Rule Searches and Fact Match Rule Searches; and Proximity Rule Searches and Pattern Match Rule Searches if the Proximity Rule Searches and Fact Match Rule Searches fail. |
| Date of Certification(s) | Proximity Rule Searches and Pattern Match Rule Searches. |
| Publication(s) | Proximity Rule Searches and Pattern Match Rule Searches |
| Date of Publication(s) | Proximity Rule Searches and Pattern Match Rule Searches. |
| Achievement(s) | Proximity Rule Searches and Pattern Match Rule Searches. |
| Dates of Achievement(s) | Proximity Rule Searches and Pattern Match Rule Searches. |
| Years of Experience | Computed field based on the cumulative experience found in the résumé. |

Figure 9:
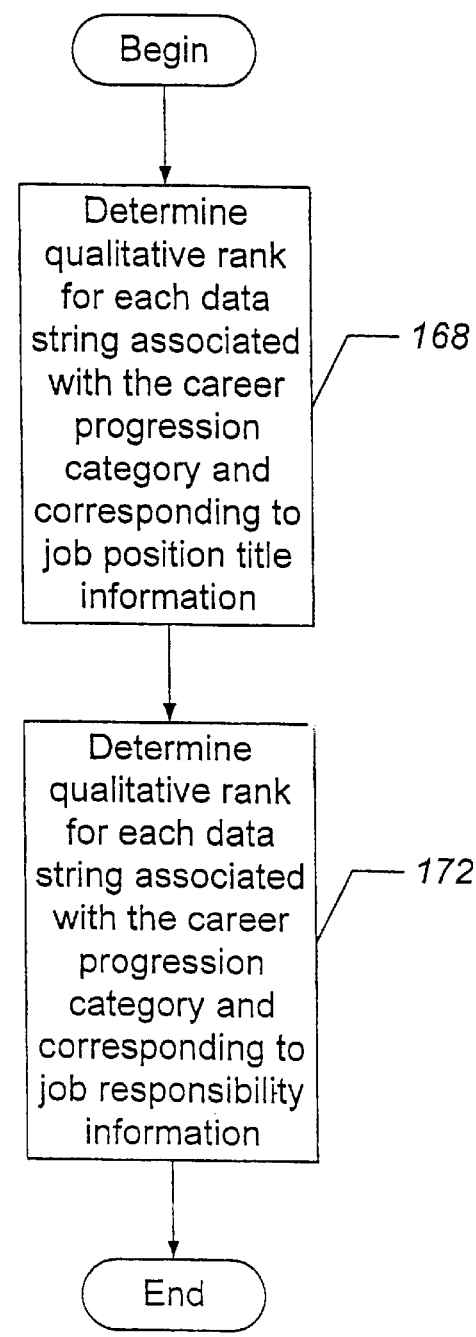

In addition to processing the received data strings and the career progression fact table 112 to associate the received data strings with the career progression information category, the career progression inference engine 102 may perform additional computations in accordance with further embodiments of the present invention illustrated in FIG. 9. In particular, the career progression inference engine 102 may determine a qualitative rank for each data string associated with the career progression category and corresponding to job position title information at block 168. Similarly, the career progression inference engine 102 may determine a qualitative rank for each data string associated with the career progression category and corresponding to job responsibility information at block 172. These qualitative rankings may be based on weights assigned to job position titles and job responsibilities in the career progression fact table 112. The weights assigned to the job position titles and job responsibilities in the career progression fact table 112 may be dynamically set by a user based on the type of qualifications sought in a job candidate.

As illustrated in TABLE 5 below, the following types of information elements may be extracted from the received data stream (e.g., a résumé) and associated with the career progression category using the listed methodologies.

TABLE 5

Career Progression Category Information Elements

| Information Element | Method of Extraction and Association |
|---|---|
| Date(s) of Employment - Begin | Pattern Match Rule Searches and Proximity Rule Searches. |
| Position Title(s) | Proximity Rule Searches and Fact Match Rule Searches; and Proximity Rule Searches and Pattern Match Rule Searches if the Proximity Rule Searches and the Fact Match Rule Searches fail. |
| Number of Occurrences of Position Title(s) | Computed field based on the number of occurrences of the position title within the résumé. |
| Ranking of Position Title(s) | Computed field based on the relative weights of different positions contained in the Career Progression Fact Table. |
| Responsibilities | Proximity Rule Searches and Fact Match Rule Searches; and Proximity Rule Searches and Pattern Match Rule Searches if the Proximity Rule Searches and the Fact Match Rule Searches fail. |
| Ranking of Responsibilities | Computed field based on the relative weights of different responsibilities contained in the Career Progression Fact Table. |

In general, the information elements associated with the career progression category are indicative of whether a candidate has moved to increasingly responsible positions throughout their or career or whether the candidate has stagnated in their career.

Thus, in summary, the information extraction expert system engine 86 comprises an inference engine (i.e., inference engines 94, 96, 98, and 102) and a knowledge base (i.e., fact tables 104, 106, 108, and 112) that may be used to associate information (i.e., data strings in a digital data stream) with multiple information categories. Because rules may be developed for the expert system to account for various organizations of data strings in the received digital data stream, a programmatic approach to categorizing the data strings need not be followed. When processing information from a résumé, the information extraction expert system engine 86 need not rely on the candidate's name being at the beginning of the résumé or the use of specific subtitles, such as "EXPERIENCE" or "EDUCATION" in the body of the résumé.

Conventional résumé processing systems may expect information to be arranged in a particular order, such as, for example, demographic information being presented first followed by education information and then employment experience information. Thus, if demographic information, such as home address, telephone number, etc., is placed at the end of the résumé, conventional résumé processing systems may confuse this information with employment experience information and, thus, interpret the candidate's address as an employer's address. Similarly, if skills, such as computer programming languages, are listed on a résumé near a school that a candidate attended or a degree that a candidate received, then conventional résumé processing system may not interpret this information as skill information because it is not located in proximity to job experience information, where skills may be frequently listed. Advantageously, the present invention may use a combination of fact match rule searches, pattern match rule searches, and proximity rule searches to improve the extraction and compilation of information contained in a résumé even if the résumé is formatted in an unconventional manner.

Figure 10:
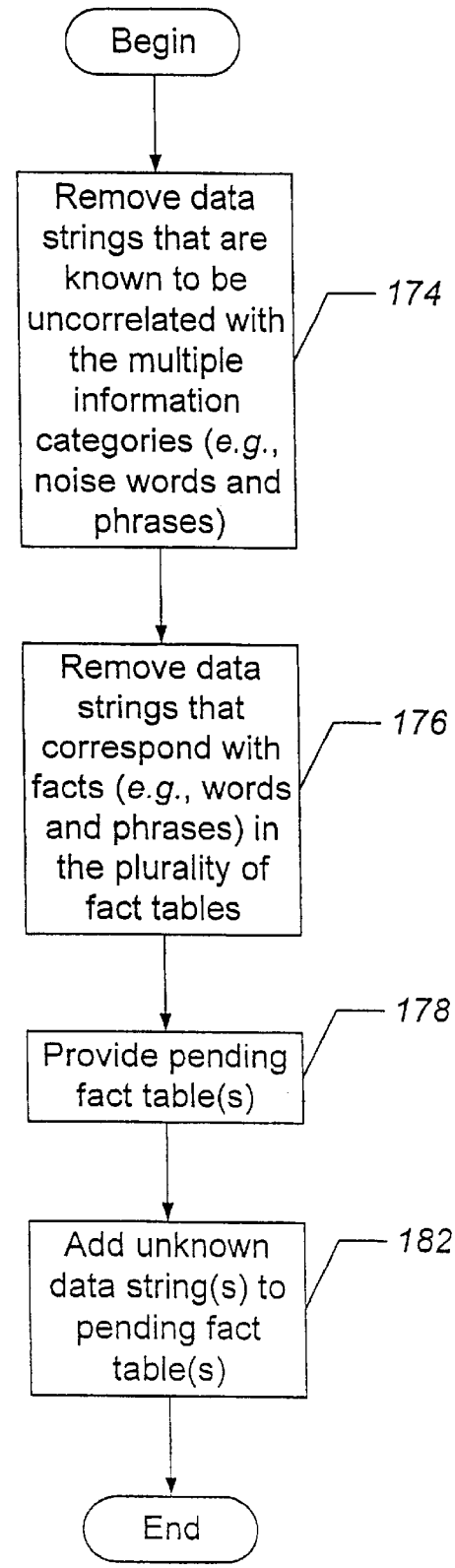

Returning to FIG. 4, at block 173, the adaptive learning engine 92 may be used to "learn" new information from the received digital data stream. According to particular embodiments of the present invention illustrated in FIG. 10, the adaptive learning engine 92 may determine whether the received digital data stream includes any unknown data strings by removing those data strings that are known to be uncorrelated with the multiple information categories at block 174. Those data strings that are known to be uncorrelated with any of the information categories may be called "noise" terms. Next, at block 176, the adaptive learning engine 92 may remove those data strings that correspond with facts in the fact tables 104, 106, 108, and 112. Those data strings that remain may be considered to be "unknown."

As discussed hereinabove with respect to FIG. 3, the adaptive learning engine may include a pending fact table as represented by block 178 in which "unknown" data strings may be stored for further processing at block 182 to determine whether they should be added to the fact tables 104, 106, 108, and 112. In accordance with particular embodiments of the present invention, the pending fact table may comprise four pending fact tables 116, 118, 122, 124, corresponding to the fact tables 104, 106, 108, and 112, respectively.

In accordance with various embodiments of the present invention, the adaptive learning engine 92 may determine which data strings stored in the pending fact tables 116, 118, 122, and 124 to add to the fact tables 104, 106, 108, and 112 in alternative ways.

Figure 11:
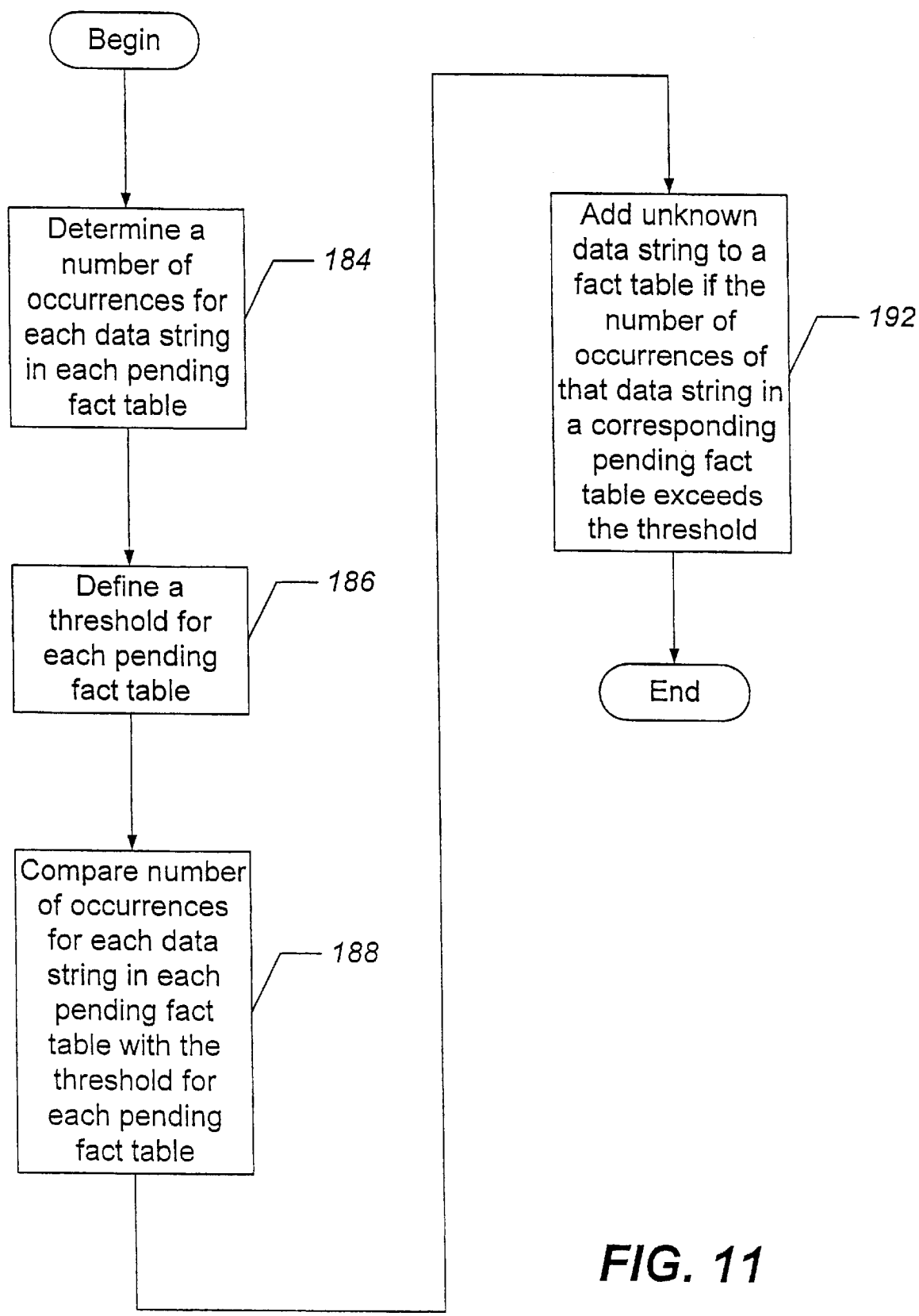

With reference to FIG. 11, one approach to determining which data strings from the pending fact tables 116, 118, 122, and 124 to add to the fact tables 104, 106, 108, and 112 begins at block 184 where the number of occurrences or "hit counts" for each data string in each one of the pending fact tables 116, 118, 122, and 124 are determined. A threshold is then defined for each of the pending fact tables 116, 118, 122, and 124 at block 186. The number of occurrences or "hit counts" for each data string in each one of the pending fact tables 116, 118, 122, and 124 are then compared with the thresholds respectively defined for each of the pending fact tables 116, 118, 122, and 124 at block 188. If the number of occurrences or "hit count" for a data string in a particular pending fact table 116, 118, 122, and 124 exceeds the threshold defined for that fact table, then the data string is added to the corresponding fact table 104, 106, 108, and 112 by the adaptive learning engine 92 at block 192. Thus, new facts may be "learned" when their frequency rises to a level that suggests that they may be used in connection with a particular information category.

Figure 12:
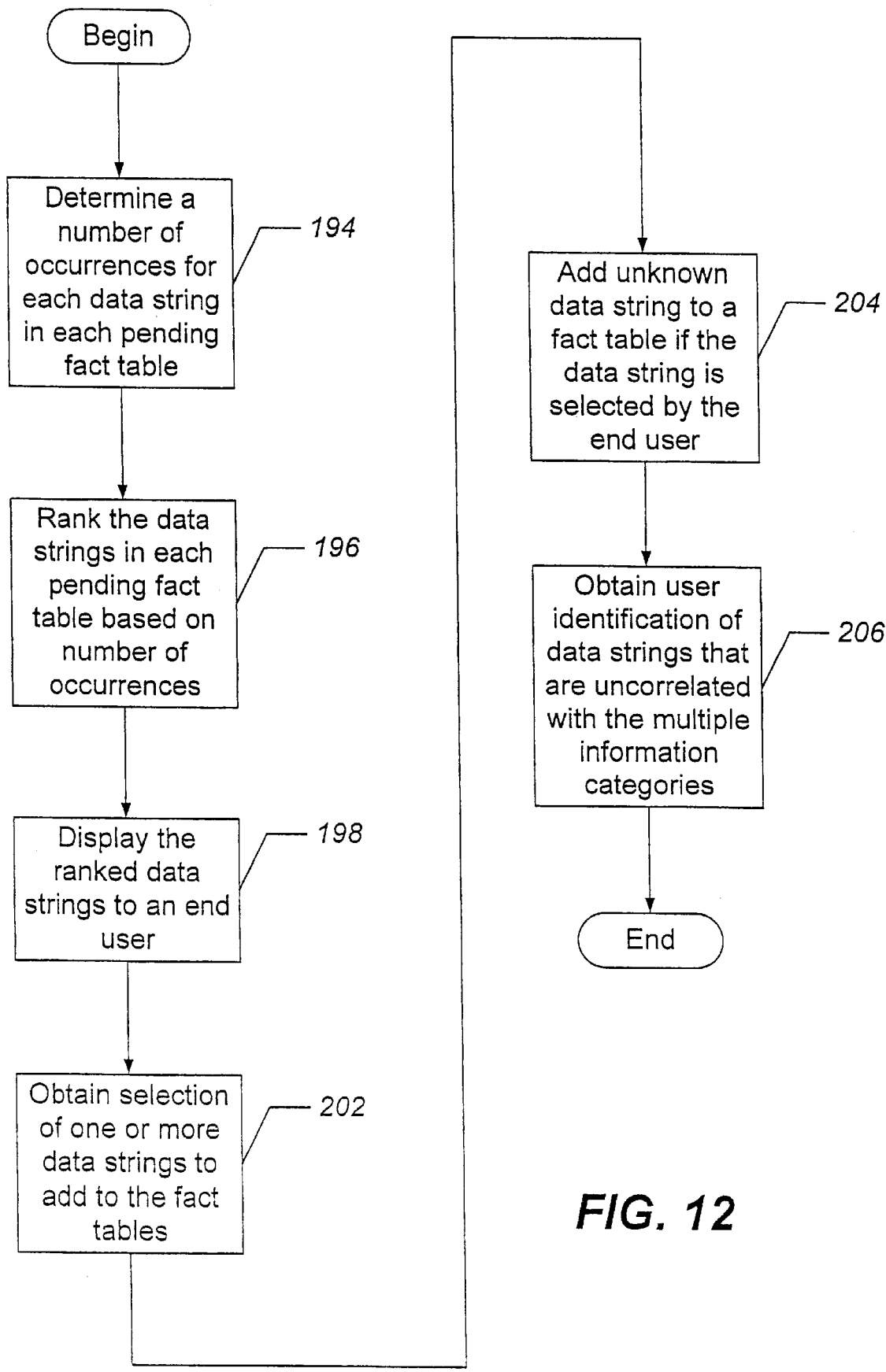

With reference to FIG. 12, another approach to determining which data strings from the pending fact tables 116, 118, 122, and 124 to add to the fact tables 104, 106, 108, and 112 begins at block 194 where the number of occurrences or "hit counts" for each data string in each one of the pending fact tables 116, 118, 122, and 124 are determined. The data strings in each of the pending fact tables 116, 118, 122, and 124 are then ranked at block 196 using the number of occurrences or "hit counts" as the ranking criterion. The adaptive learning engine 92 then displays the ranked lists of unknown data strings to an end user at block 198 using, for example, a display monitor. At block 202, a selection may be obtained from the user of one or more data strings from the ranked lists to be added to the fact tables 104, 106, 108, and 112. Accordingly, at block 204, if an unknown data string has been selected by the user at block 202, then that data string is added to the fact table 104, 106, 108, or 112 corresponding to the pending fact table 116, 118, 122, or 124 from which the data string was selected. In addition, the user may also identify those data strings in the pending fact tables 116, 118, 122, and 124 that are uncorrelated with any of the information categories at block 206 and, therefore, may be treated as "noise" terms.

Advantageously, the adaptive learning engine 92 may allow the content of the knowledge base contained in the fact tables 104, 106, 108, and 112 to be enlarged by adding previously unknown data strings to the fact tables 104, 106, 108, and 112 if the frequency of an unknown data string is sufficient to justify adding the unknown data string to the fact tables 104, 106, 108, and 112 or if a user identifies an unknown data string as a fact that should be added to the fact tables 104, 106, 108, and 112.

Returning to FIG. 4, once the received data strings from the digital data stream have been associated with the information categories, the information output module 88 may be used to arrange the data strings in a file based on their associations with the information categories at block 208.

Figure 13:
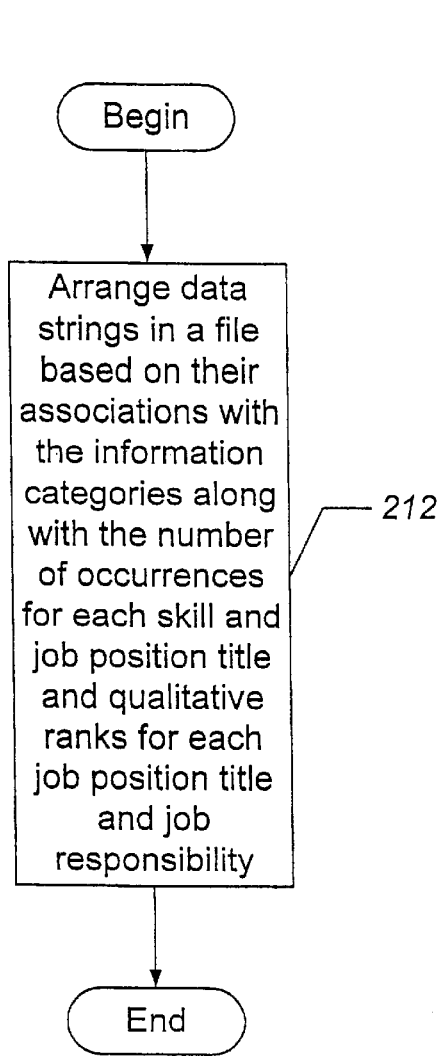

In accordance with embodiments of the present invention illustrated in FIG. 13, the data strings may be arranged in a file at block 212 based on their associations with the information categories along with the following computed information: the number of occurrences for each data string that is associated with the skill set category, the number of occurrences for each data string that is associated with the career progression category and corresponds to job title information, and the qualitative rank for each data string that is associated with the career progression category and corresponds to job title information or job responsibility information.

Figure 4:
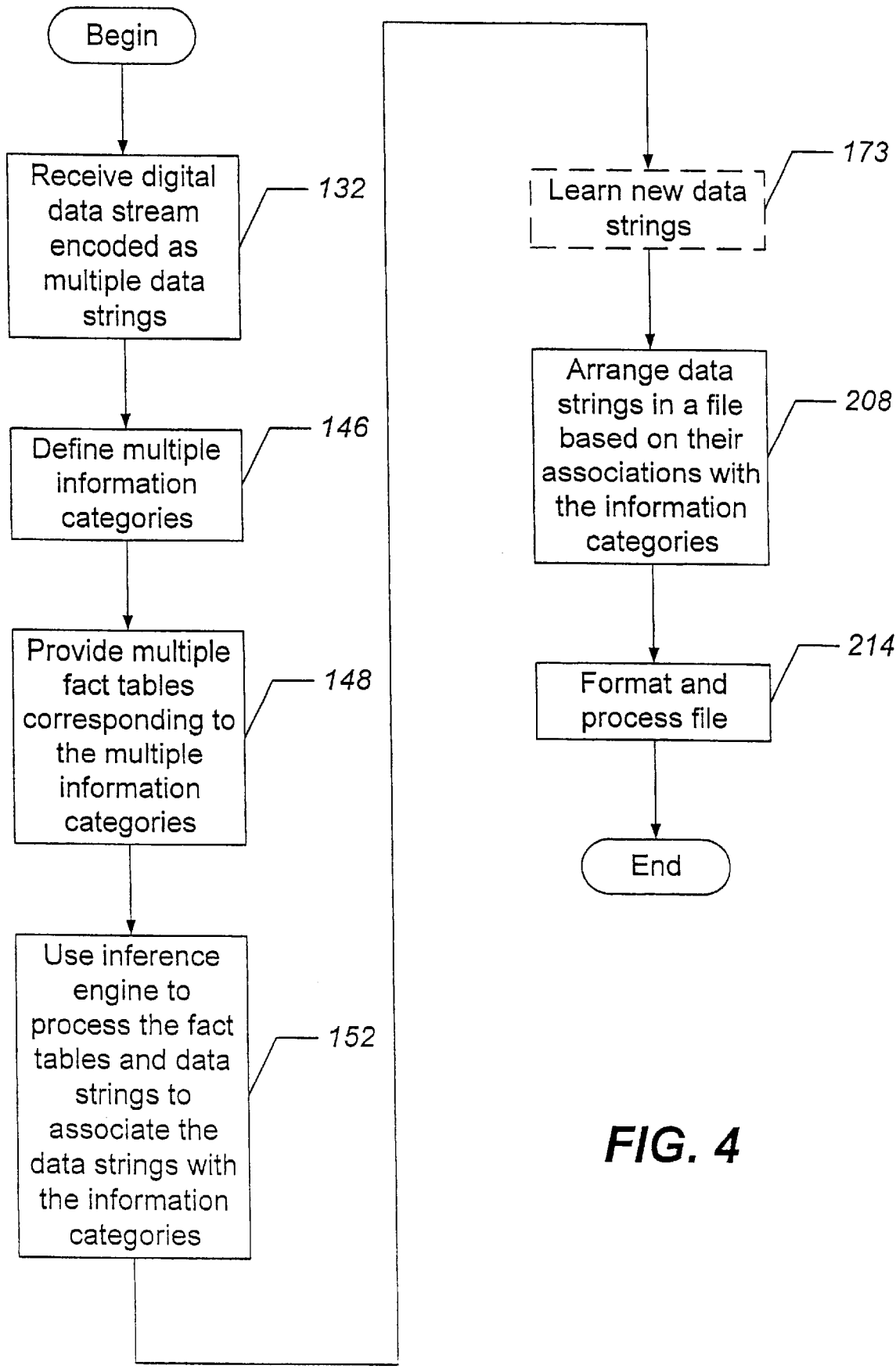
FIGS. 4–14 are flow charts that illustrate exemplary operations of methods, systems, and computer program products for compiling information into information categories in accordance with embodiments of the present invention.
Figure 14:
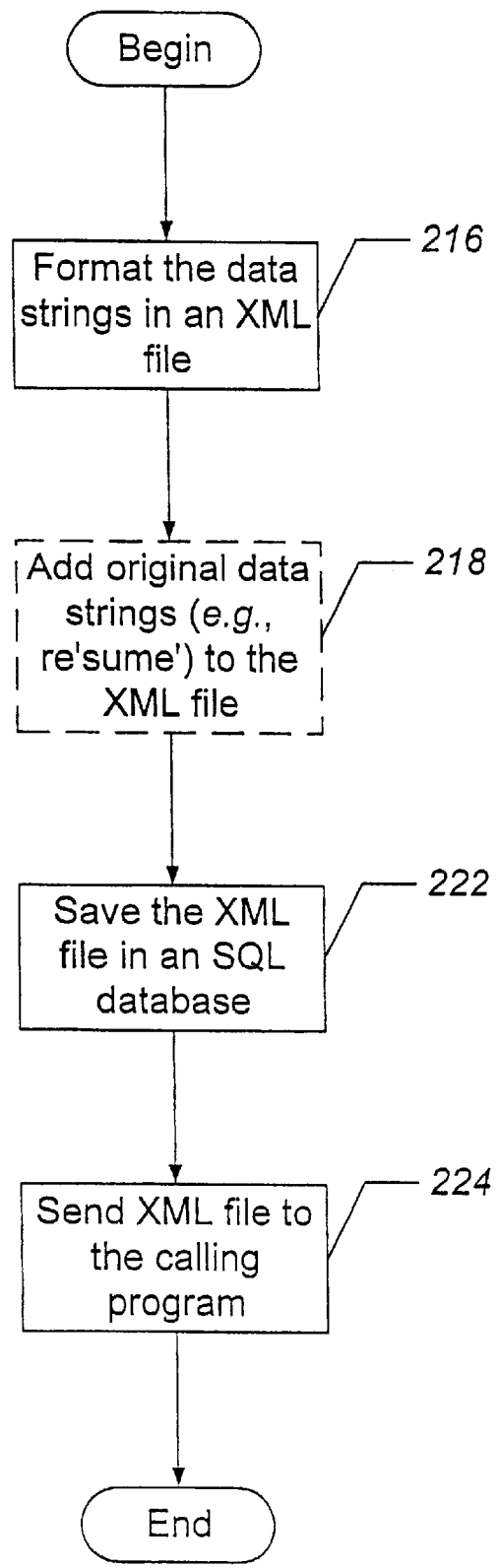

With reference to FIG. 4, once the data strings and any computed information have been arranged in a file at block 208, the information output module 88 may format and process the file at block 214. For example, as illustrated in FIG. 14, the information output module 88 may format the data strings in an XML file at block 216. Advantageously, by formatting the file in XML, the file may be described in terms of logical parts or elements. For example, the information categories and the various data strings that are associated with each category may be represented in the XML file as specific elements.

An exemplary XML file structure for arranging the data strings extracted from a résumé along with the aforementioned computed information (see FIG. 13) is set forth hereafter:

XML Pseudo-Structure for Compiled Resume Information

```
<Demographics>
    <FirstName></FirstName>
    <LastName></LastName>
    <Middle Initial></MiddleInitial>
    <Suffix></Suffix>
    <Address></Address>
    <City></City>
    <State></State>
    <PostalCode></PostalCode>
    </PhoneNumbers>
        <CountryCode></CountryCode>
        <Area-City-Code></Area-City-Code>
        <PhoneNumber></PhoneNumber>
    </PhoneNumbers>
    <HighSalary</HighSalary>
    <LowSalary></LowSalary>
    <Country></Country>
    <EMail></EMail>
    <Years Experience>
    <JobCode></JobCode>
    <Region></Region>
    <Source></Source>
    <WebSite></WebSite>
</Demographics>< >
<Skills>
    <SkillName></SkillName>
    <Occurrences></Occurrences>
</Skills>
<Experience>
    <Employment>
        <Company>
            <CompanyName></CompanyName>
            <BeginDate></BeginDate>
            <EndDate></EndDate>
            <Positions>
                <PositionName></PositionName>
                <Skills>
                    <SkillName><SkillName>
                    <Occurrences></Occurrences>
                </Skills>
                <PositionText></PositionText>
            </Positions>
        </Company>
    </Employment>
    <Education>
        <Schools>
            <SchoolName></SchoolName
            <GraduationDate></GraduationDate>
            <Degree></Degree>
            <Annotations></Annotations>
            <Major></Major>
            <Minor></Minor>
            <GPAMajor></GPAMajor>
            <GPAMinor></GPAMinor>
        </Schools>
    </Education>
    <Certifications>
        <CertificationName></CertificationName>
        <DateObtained></DateObtained>
    </Certifications>
    <OtherAchievements>
        <Description></Description>
        <DateObtained><DateObtained>
    </OtherAchievements>
</Experience>
<CareerProgression>
    <Positions>
        <PositionTitle></PositionTitle>
        <Occurrences></Occurences>
        <Ranking></Ranking>
        <Responsibilities>
            <ResponsibilityName></ResponsibilityName>
            <ResponsibilityRanking></ResponsibilityRanking>
            <Responsibilities>
        </Positions>
</CareerProgression>
```

Optionally, the information output module 88 may add the data strings as received in the digital data stream (i.e., in their received arrangement) to the XML file at block 218. For example, in the context of compiling information from a résumé, the XML file may include the compiled information from the résumé, which is arranged by information category, along with an unprocessed or unmodified version of the résumé.

To facilitate processing of the XML file by other applications, the SQL database interface module 114 may save the XML file in the SQL database 34 (see FIG. 1) at block 222. By storing the XML file in an SQL database, other applications may access the XML file using SQL requests and need not know the proprietary interface of the underlying database. In addition, the information output module 88 may store the XML file in the file system 32 (see FIG. 1) for further local processing.

Finally, at block 224, the information output module 88 may send the XML file to the calling program that was the originator of the received digital data stream (e.g., the source of a résumé file or other information stream).

The flowcharts of FIGS. 4–14 show the architecture, functionality, and operation of exemplary implementations of the software and data used compile information into information categories using an expert system in accordance with the present invention. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 4–14. For example, two blocks shown in succession in FIGS. 4–14 may be executed substantially concurrently or the blocks may sometimes be executed in the reverse order, depending upon the functionality involved.

From the foregoing it can readily be seen that, in accordance with the present invention, information, which may be received in a variety of different formats, may be compiled into a structured arrangement by using an expert system to associate information data strings with predetermined information categories. For example, the present invention may be used to compile information from candidate résumés, which may be written in many different types of formats or styles, into a structured arrangement in which the information is organized based on a set of information categories that are typically associated with a résumé. Once the information has been arranged in a structured format, other applications may more readily access and process the information because of the uniformity in which the information is arranged and stored.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of compiling résumé information into information categories, comprising:

defining a plurality of information categories;

providing a plurality of fact tables, a respective one of the plurality of fact tables containing facts and rules that are associated with a respective one of the plurality of information categories;

receiving a digital data stream comprising résumé information encoded as a plurality of data strings;

using an inference engine to process at least one of the plurality of data strings and the facts and the rules that are associated with at least one of the plurality of fact tables to associate the at least one of the plurality of data strings with at least one of the plurality of information categories; and arranging the at least one of the plurality of data strings in a file based on the association between the at least one of the plurality of data strings and the at least one of the plurality of information categories.

2. A method as recited in claim 1, wherein the rules comprise:

fact match rules;

pattern match rules; and proximity search rules.

3. A method as recited in claim 2, wherein using the inference engine to process the at least one of the plurality of data strings and the facts and the rules that are associated with the at least one of the plurality of fact tables to associate the at least one of the plurality of data strings with the at least one of the plurality of information categories comprises:

processing the facts, the fact match rules, and the plurality of data strings for the at least one of the plurality of fact tables to associate the at least one of the plurality of data strings with the at least one of the plurality of information categories;

processing the pattern match rules and the plurality of data strings for the at least one of the plurality of fact tables to associate the at least one of the plurality of data strings with the at least one of the plurality of information categories; and processing the proximity search rules and the plurality of data strings for the at least one of the plurality of fact tables to associate the at least one of the plurality of data strings with the at least one of the plurality of information categories.

4. A method as recited in claim 1, wherein receiving the digital data stream comprising information encoded as a plurality of data strings comprises:

determining a coding scheme used to encode the plurality of data strings; and translating the plurality of data strings into an American Standard Code for Information Interchange (ASCII) coding scheme if the plurality of data strings are encoded using a coding scheme other than ASCII.

5. A method as recited in claim 4, wherein the file is an extensible markup language (XML) file.

6. A method as recited in claim 5, further comprising:

adding the plurality of data strings to the XML file in their received arrangement.

7. A method as recited in claim 5, further comprising:

saving the XML file in a structured query language (SQL) database.

8. A method as recited in claim 5, further comprising:

sending the XML file to an originator of the digital data stream.

9. A method as recited in claim 1, further comprising:

determining whether the plurality of data strings contains at least one unknown data string;

providing a pending fact table; and adding the at least one unknown data string to the pending fact table if the plurality of data strings contains the at least one unknown data string.

10. A method as recited in claim 9, wherein determining whether the plurality of data strings contains the at least one unknown data string comprises:

removing from the plurality of data strings any data string that is known to be uncorrelated with any of the plurality of information categories; and removing from the plurality of data strings any data string that corresponds to one of the facts in the plurality of fact tables.

11. A method as recited in claim 9, wherein the pending fact table comprises a plurality of pending fact tables, a respective one of the plurality of pending fact tables being associated with a respective one of the plurality of fact tables, and wherein adding the at least one unknown data string to the pending fact table if the plurality of data strings contains the at least one unknown data string comprises:

adding the at least one unknown data string to at least one of the plurality of pending fact tables if the plurality of data strings contains the at least one unknown data string.

12. A method as recited in claim 11, further comprising:

determining a respective number of occurrences for the respective one of the at least one unknown data string in the respective one of the plurality of pending fact tables.

13. A method as recited in claim 12, further comprising:

defining a plurality of thresholds, a respective one of the plurality of thresholds being associated with the respective one of the plurality of pending fact tables;

comparing the respective number of occurrences for the respective one of the at least one unknown data string in the respective one of the plurality of pending fact tables with the associated respective one of the plurality of thresholds; and adding the respective one of the at least one unknown data string to the respective one of the plurality of fact tables associated with the respective one of the plurality of pending fact tables if the respective number of occurrences for the respective one of the at least one unknown data string exceeds the respective one of the plurality of thresholds.

14. A method as recited in claim 12, further comprising:

ranking the respective one of the at least one unknown data string in the respective one of the plurality of pending fact tables based on the respective number of occurrences of the respective one of the at least one unknown data string;

displaying the ranked respective one of the at least one unknown data string in the respective one of the plurality of pending fact tables to an end user;

obtaining user input to select which of the respective one of the at least one unknown data string in the respective one of the plurality of pending fact tables to add to the respective one of the plurality of fact tables associated with the respective one of the plurality of pending fact tables; and adding the respective one of the at least one unknown data string to the respective one of the plurality of fact tables associated with the respective one of the plurality of pending fact tables if the respective one of the at least one unknown data string is selected by the end user.

15. A method as recited in claim 14, further comprising:

obtaining user input to identify which of the respective one of the at least one unknown data string in the respective one of the plurality of pending fact tables are uncorrelated with any of the plurality of information categories.

16. A method as recited in claim 1, wherein the plurality of information categories comprise:

a demographic category;
a skill set category;
an education and employment category; and
a career progression category.

17. A method as recited in claim 16, wherein the career progression category comprises job position title information and job responsibility information, the method further comprising:
   determining a number of occurrences of each data string of the plurality of data strings that is associated with the skill set category; and
   determining a number of occurrences of each data string of the plurality of data strings that is associated with the career progression category and corresponds to job position title information.

18. A method as recited in claim 17, further comprising:
   determining a qualitative rank for each data string of the plurality of data strings that is associated with the career progression category and corresponds to job position title information; and
   determining a qualitative rank for each data string of the plurality of data strings that is associated with the career progression category and corresponds to job responsibility information.

19. A method as recited in claim 18, wherein arranging the at least one of the plurality of data strings in the file based on the association between the at least one of the plurality of data strings and the at least one of the plurality of information categories comprises:
   arranging the at least one of the plurality of data strings, the number of occurrences of each data string that is associated with the skill set category, the number of occurrences of each data string that is associated with the career progression category and corresponds to job position title information, the qualitative rank for each data string that is associated with the career progression category and corresponds to job position title information, and the qualitative rank for each data string that is associated with the career progression category and corresponds to job responsibility information in the file based on the association between the at least one of the plurality of data strings and the at least one of the plurality of information categories.

20. A system for compiling résumé information into information categories, comprising:
   an information format module that is configured to receive a digital data stream that comprises résumé information encoded as a plurality of data strings;
   an information extraction expert system engine module that comprises a plurality of fact tables and at least one inference engine, a respective one of the plurality of fact tables containing facts and rules that are associated with a respective one-of a plurality of information categories, the at least one inference engine being configured to process the facts, the rules, and the plurality of data strings for at least one of the plurality of fact tables to associate at least one of the plurality of data strings with at least one of the plurality of information categories; and
   an information output module that is configured to arrange the at least one of the plurality of data strings in a file based on the association between the at least one of the plurality of data strings and the at least one of the plurality of information categories.

21. A system as recited in claim 20, wherein the information output module comprises:
   a structured query language (SQL) database interface module that is configured to save the file in an SQL database.

22. A system as recited in claim 20, further comprising:
   an adaptive learning engine module that is configured to determine whether the plurality of data strings contains at least one unknown data string, and to add the at least one unknown data string to a pending fact table if the plurality of data strings contains the at least one unknown data string.

23. A system as recited in claim 22, wherein the adaptive learning engine module is further configured to process the pending fact table to determine whether to add the at least one unknown data string to at least one of the plurality of fact tables.

24. A system for compiling résumé information into information categories, comprising:
   means for defining a plurality of information categories;
   means for providing a plurality of fact tables, a respective one of the plurality of fact tables containing facts and rules that are associated with a respective one of the plurality of information categories;
   means for receiving a digital data stream comprising résumé information encoded as a plurality of data strings;
   means for using an inference engine to process at least one of the plurality of data strings and the facts and the rules that are associated with at least one of the plurality of fact tables to associate the at least one of the plurality of data strings with at least one of the plurality of information categories; and
   means for arranging the at least one of the plurality of data strings in a file based on the association between the at least one of the plurality of data strings and the at least one of the plurality of information categories.

25. A system as recited in claim 24, wherein the rules comprise:
   fact match rules;
   pattern match rules; and
   proximity search rules.

26. A system as recited in claim 25, wherein the means for using the inference engine to process the at least one of the plurality of data strings and the facts and the rules that are associated with the at least one of the plurality of fact tables to associate the at least one of the plurality of data strings with the at least one of the plurality of information categories comprises:
   means for processing the facts, the fact match rules, and the plurality of data strings for the at least one of the plurality of fact tables to associate the at least one of the plurality of data strings with the at least one of the plurality of information categories;
   means for processing the pattern match rules and the plurality of data strings for the at least one of the plurality of fact tables to associate the at least one of the plurality of data strings with the at least one of the plurality of information categories; and
   means for processing the proximity search rules and the plurality of data strings for the at least one of the plurality of fact tables to associate the at least one of the plurality of data strings with the at least one of the plurality of information categories.

27. A system as recited in claim 24, wherein the means for receiving the digital data stream comprising information encoded as a plurality of data strings comprises:

means for determining a coding scheme used to encode the plurality of data strings; and means for translating the plurality of data strings into an American Standard Code for Information Interchange (ASCII) coding scheme if the plurality of data strings are encoded using a coding scheme other than ASCII.

28. A system as recited in claim 27, wherein the file is an extensible markup language (XML) file.

29. A system as recited in claim 28, further comprising:
means for adding the plurality of data strings to the XML file in their received arrangement.

30. A system as recited in claim 28, further comprising:
means for saving the XML file in a structured query language (SQL) database.

31. A system as recited in claim 28, further comprising:
means for sending the XML file to an originator of the digital data stream.

32. A system as recited in claim 24, further comprising:
means for determining whether the plurality of data strings contains at least one unknown data string;
means for providing a pending fact table; and
means for adding the at least one unknown data string to the pending fact table if the plurality of data strings contains the at least one unknown data string.

33. A system as recited in claim 32, wherein the means for determining whether the plurality of data strings contains the at least one unknown data string comprises:
means for removing from the plurality of data strings any data string that is known to be uncorrelated with any of the plurality of information categories; and
means for removing from the plurality of data strings any data string that corresponds to one of the facts in the plurality of fact tables.

34. A system as recited in claim 32, wherein the pending fact table comprises a plurality of pending fact tables, a respective one of the plurality of pending fact tables being associated with a respective one of the plurality of fact tables, and wherein the means for adding the at least one unknown data string to the pending fact table if the plurality of data strings contains the at least one unknown data string comprises:
means for adding the at least one unknown data string to at least one of the plurality of pending fact tables if the plurality of data strings contains the at least one unknown data string.

35. A system as recited in claim 34, further comprising:
means for determining a respective number of occurrences for the respective one of the at least one unknown data string in the respective one of the plurality of pending fact tables.

36. A system as recited in claim 35, further comprising:
means for defining a plurality of thresholds, a respective one of the plurality of thresholds being associated with the respective one of the plurality of pending fact tables;
means for comparing the respective number of occurrences for the respective one of the at least one unknown data string in the respective one of the plurality of pending fact tables with the associated respective one of the plurality of thresholds; and
means for adding the respective one of the at least one unknown data string to the respective one of the plurality of fact tables associated with the respective one of the plurality of pending fact tables if the respective number of occurrences for the respective one of the at least one unknown data string exceeds the respective one of the plurality of thresholds.

37. A system as recited in claim 35, further comprising:
means for ranking the respective one of the at least one unknown data string in the respective one of the plurality of pending fact tables based on the respective number of occurrences of the respective one of the at least one unknown data string;
means for displaying the ranked respective one of the at least one unknown data string in the respective one of the plurality of pending fact tables to an end user;
means for obtaining user input to select which of the respective one of the at least one unknown data string in the respective one of the plurality of pending fact tables to add to the respective one of the plurality of fact tables associated with the respective one of the plurality of pending fact tables; and
means for adding the respective one of the at least one unknown data string to the respective one of the plurality of fact tables associated with the respective one of the plurality of pending fact tables if the respective one of the at least one unknown data string is selected by the end user.

38. A system as recited in claim 37, further comprising:
means for obtaining user input to identify which of the respective one of the at least one unknown data string in the respective one of the plurality of pending fact tables are uncorrelated with any of the plurality of information categories.

39. A system as recited in claim 38, wherein the plurality of information categories comprise:
a demographic category;
a skill set category;
an education and employment category; and
a career progression category.

40. A system as recited in claim 39, wherein the career progression category comprises job position title information and job responsibility information, the system further comprising:
means for determining a number of occurrences of each data string of the plurality of data strings that is associated with the skill set category; and
means for determining a number of occurrences of each data string of the plurality of data strings that is associated with the career progression category and corresponds to job position title information.

41. A system as recited in claim 40, further comprising:
means for determining a qualitative rank for each data string of the plurality of data strings that is associated with the career progression category and corresponds to job position title information; and
means for determining a qualitative rank for each data string of the plurality of data strings that is associated with the career progression category and corresponds to job responsibility information.

42. A system as recited in claim 41, wherein the means for arranging the at least one of the plurality of data strings in the file based on the association between the at least one of the plurality of data strings and the at least one of the plurality of information categories comprises:
means for arranging the at least one of the plurality of data strings, the number of occurrences of each data string that is associated with the skill set category, the number of occurrences of each data string that is associated with the career progression category and corresponds to job position title information, the qualitative rank for each data string that is associated with the career progression category and corresponds to job position title information, and the qualitative rank for each data string that is associated with the career progression category and corresponds to job responsibility information in the file based on the association between the at least one of the plurality of data strings and the at least one of the plurality of information categories.

43. A computer program product for compiling résumé information into information categories, comprising:

a computer readable storage medium having computer readable program code embodied therein, the computer readable program code comprising:

computer readable program code for defining a plurality of information categories;

computer readable program code for providing a plurality of fact tables, a respective one of the plurality of fact tables containing facts and rules that are associated with a respective one of the plurality of information categories;

computer readable program code for receiving a digital data stream comprising résumé information encoded as a plurality of data strings;

computer readable program code for using an inference engine to process at least one of the plurality of data strings and the facts and the rules that are associated with at least one of the plurality of fact tables to associate the at least one of the plurality of data strings with at least one of the plurality of information categories; and computer readable program code for arranging the at least one of the plurality of data strings in a file based on the association between the at least one of the plurality of data strings and the at least one of the plurality of information categories.

44. A computer program product as recited in claim 43, wherein the rules comprise:

fact match rules;

pattern match rules; and proximity search rules.

45. A computer program product as recited in claim 44, wherein the computer readable program code for using the inference engine to process the at least one of the plurality of data strings and the facts and the rules that are associated with the at least one of the plurality of fact tables to associate the at least one of the plurality of data strings with the at least one of the plurality of information categories comprises:

computer readable program code for processing the facts, the fact match rules, and the plurality of data strings for the at least one of the plurality of fact tables to associate the at least one of the plurality of data strings with the at least one of the plurality of information categories;

computer readable program code for processing the pattern match rules and the plurality of data strings for the at least one of the plurality of fact tables to associate the at least one of the plurality of data strings with the at least one of the plurality of information categories; and computer readable program code for processing the proximity search rules and the plurality of data strings for the at least one of the plurality of fact tables to associate the at least one of the plurality of data strings with the at least one of the plurality of information categories.

46. A computer program product as recited in claim 43, wherein the computer readable program code for receiving the digital data stream comprising information encoded as a plurality of data strings comprises:

computer readable program code for determining a coding scheme used to encode the plurality of data strings; and computer readable program code for translating the plurality of data strings into an American Standard Code for Information Interchange (ASCII) coding scheme if the plurality of data strings are encoded using a coding scheme other than ASCII.

47. A computer program product as recited in claim 46, wherein the file is an extensible markup language (XML) file.

48. A computer program product as recited in claim 47, further comprising:

computer readable program code for adding the plurality of data strings to the XML file in their received arrangement.

49. A computer program product as recited in claim 47, further comprising:

computer readable program code for saving the XML file in a structured query language (SQL) database.

50. A computer program product as recited in claim 47, further comprising:

computer readable program code for sending the XML file to an originator of the digital data stream.

51. A computer program product as recited in claim 43, further comprising:

computer readable program code for determining whether the plurality of data strings contains at least one unknown data string;

computer readable program code for providing a pending fact table; and computer readable program code for adding the at least one unknown data string to the pending fact table if the plurality of data strings contains the at least one unknown data string.

52. A computer program product as recited in claim 51, wherein the computer readable program code for determining whether the plurality of data strings contains the at least one unknown data string comprises:

computer readable program code for removing from the plurality of data strings any data string that is known to be uncorrelated with any of the plurality of information categories; and computer readable program code for removing from the plurality of data strings any data string that corresponds to one of the facts in the plurality of fact tables.

53. A computer program product as recited in claim 51, wherein the pending fact table comprises a plurality of pending fact tables, a respective one of the plurality of pending fact tables being associated with a respective one of the plurality of fact tables, and wherein the computer readable program code for adding the at least one unknown data string to the pending fact table if the plurality of data strings contains the at least one unknown data string comprises:

computer readable program code for adding the at least one unknown data string to at least one of the plurality of pending fact tables if the plurality of data strings contains the at least one unknown data string.

54. A computer program product as recited in claim 53, further comprising:

computer readable program code for determining a respective number of occurrences for the respective one of the at least one unknown data string in the respective one of the plurality of pending fact tables.

55. A computer program product as recited in claim 54, further comprising:

computer readable program code for defining a plurality of thresholds, a respective one of the plurality of thresholds being associated with the respective one of the plurality of pending fact tables;

computer readable program code for comparing the respective number of occurrences for the respective one of the at least one unknown data string in the respective one of the plurality of pending fact tables with the associated respective one of the plurality of thresholds; and computer readable program code for adding the respective one of the at least one unknown data string to the respective one of the plurality of fact tables associated with the respective one of the plurality of pending fact tables if the respective number of occurrences for the respective one of the at least one unknown data string exceeds the respective one of the plurality of thresholds.

56. A computer program product as recited in claim 54, further comprising:

computer readable program code for ranking the respective one of the at least one unknown data string in the respective one of the plurality of pending fact tables based on the respective number of occurrences of the respective one of the at least one unknown data string;

computer readable program code for displaying the ranked respective one of the at least one unknown data string in the respective one of the plurality of pending fact tables to an end user;

computer readable program code for obtaining user input to select which of the respective one of the at least one unknown data string in the respective one of the plurality of pending fact tables to add to the respective one of the plurality of fact tables associated with the respective one of the plurality of pending fact tables; and computer readable program code for adding the respective one of the at least one unknown data string to the respective one of the plurality of fact tables associated with the respective one of the plurality of pending fact tables if the respective one of the at least one unknown data string is selected by the end user.

57. A computer program product as recited in claim 56, further comprising:

computer readable program code for obtaining user input to identify which of the respective one of the at least one unknown data string in the respective one of the plurality of pending fact tables are uncorrelated with any of the plurality of information categories.

58. A computer program product as recited in claim 43, wherein the plurality of information categories comprise:

a demographic category;

a skill set category;

an education and employment category; and a career progression category.

59. A computer program product as recited in claim 58, wherein the career progression category comprises job position title information and job responsibility information, the computer program product further comprising:

computer readable program code for determining a number of occurrences of each data string of the plurality of data strings that is associated with the skill set category; and computer readable program code for determining a number of occurrences of each data string of the plurality of data strings that is associated with the career progression category and corresponds to job position title information.

60. A computer program product as recited in claim 59, further comprising:

computer readable program code for determining a qualitative rank for each data string of the plurality of data strings that is associated with the career progression category and corresponds to job position title information; and computer readable program code for determining a qualitative rank for each data string of the plurality of data strings that is associated with the career progression category and corresponds to job responsibility information.

61. A computer program product as recited in claim 60, wherein the computer readable program code for arranging the at least one of the plurality of data strings in the file based on the association between the at least one of the plurality of data strings and the at least one of the plurality of information categories comprises:

computer readable program code for arranging the at least one of the plurality of data strings, the number of occurrences of each data string that is associated with the skill set category, the number of occurrences of each data string that is associated with the career progression category and corresponds to job position title information, the qualitative rank for each data string that is associated with the career progression category and corresponds to job position title information, and the qualitative rank for each data string that is associated with the career progression category and corresponds to job responsibility information in the file based on the association between the at least one of the plurality of data strings and the at least one of the plurality of information categories.

* * * * *

UNITED STATES PATENT AND TRADEMARK OFFICE
CERTIFICATE OF CORRECTION

PATENT NO.    : 6,691,122 B1
DATED         : February 10, 2004
INVENTOR(S)   : Witte et al.

It is certified that error appears in the above-identified patent and that said Letters Patent is hereby corrected as shown below:

Column 23,
Line 54, should read -- with a respective one of a plurality of information --

Column 26,
Line 31, should read -- 39. A system as recited in claim 24, wherein the plurality --

Signed and Sealed this

Twenty-first Day of September, 2004

JON W. DUDAS
*Director of the United States Patent and Trademark Office*